United States Patent
Kurokawa

(10) Patent No.: US 12,292,555 B2
(45) Date of Patent: May 6, 2025

(54) ZOOM LENS AND IMAGE PICKUP APPARATUS

(71) Applicant: CANON KABUSHIKI KAISHA, Tokyo (JP)

(72) Inventor: Shuichi Kurokawa, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 301 days.

(21) Appl. No.: 18/167,140

(22) Filed: Feb. 10, 2023

(65) Prior Publication Data

US 2023/0266572 A1   Aug. 24, 2023

(30) Foreign Application Priority Data

Feb. 18, 2022   (JP) .................................. 2022-023804

(51) Int. Cl.
| | | |
|---|---|---|
| *G02B 15/14* | (2006.01) | |
| *G02B 13/00* | (2006.01) | |
| *G02B 13/02* | (2006.01) | |
| *G02B 13/18* | (2006.01) | |

(52) U.S. Cl.
CPC .... *G02B 15/144511* (2019.08); *G02B 13/006* (2013.01); *G02B 13/02* (2013.01); *G02B 13/18* (2013.01)

(58) Field of Classification Search
CPC ...... G02B 13/006; G02B 13/02; G02B 13/18; G02B 15/144511; G02B 15/1461; G02B 15/145129; G02B 15/173; G02B 15/20
See application file for complete search history.

(56) References Cited

U.S. PATENT DOCUMENTS

| | | |
|---|---|---|
| 9,517,637 B2 | 12/2016 | Kurokawa |
| 9,860,409 B2 | 1/2018 | Kurokawa |
| 2006/0119955 A1 | 6/2006 | Kimura |
| 2008/0285142 A1 | 11/2008 | Kuo |
| 2016/0091699 A1 | 3/2016 | Lin |
| 2021/0116786 A1 | 4/2021 | Kurokawa |
| 2022/0236533 A1 | 7/2022 | Takahashi et al. |
| 2022/0236541 A1 | 7/2022 | Kurokawa et al. |

FOREIGN PATENT DOCUMENTS

| | | |
|---|---|---|
| JP | H10-186235 A | 7/1998 |
| JP | 2012-047813 A | 3/2012 |
| JP | 2014-109761 A | 6/2014 |

OTHER PUBLICATIONS

Combined Search and Examination Report issued by the Intellectual Property Office on Aug. 9, 2023 in corresponding GB Patent Application No. 2301943.3.

*Primary Examiner* — Jack Dinh
(74) *Attorney, Agent, or Firm* — Carter, DeLuca & Farrell LLP

(57) ABSTRACT

The zoom lens includes, in order from an object side to an image side, a first lens unit having a negative refractive power, a second lens unit having a positive refractive power, a middle group including two or more lens units, and a rear group including one or more lens units and having a positive refractive power. The first lens unit does not move for zooming. During zooming, the second lens unit moves and a distance between each adjacent lens units changes. In all lens units of the zoom lens, during zooming the second lens unit moves by a largest moving amount and has a largest zooming ratio between a wide-angle end and a telephoto end. Predetermined conditions are satisfied.

14 Claims, 13 Drawing Sheets

ZOOM LENS AND IMAGE PICKUP APPARATUS

BACKGROUND OF THE INVENTION

Field of the Invention

The aspect of the embodiments relates to a zoom lens and an image pickup apparatus.

Description of the Related Art

Zoom lenses used in image pickup apparatuses, such as surveillance cameras, digital still cameras, video cameras, and broadcasting cameras, are desired to have a wider angle of view and a smaller size. Each of Japanese Patent Application Laid-Open Nos. 2012-047813 and 2014-109761 discloses a negative lead type zoom lens as a small zoom lens having a wide angle of view.

The zoom lenses as described above are also demanded to have high optical performance capable of acquiring an image with high image quality such as 8K quality.

SUMMARY OF THE INVENTION

The present disclosure provides, for example, a zoom lens that is beneficial to a wide angle of view, a small size, and high optical performance.

A zoom lens according to one aspect of the embodiments includes, in order from an object side to an image side, a first lens unit having a negative refractive power, a second lens unit having a positive refractive power, a middle group including two or more lens units, and a rear group including one or more lens units and having a positive refractive power. The first lens unit does not move for zooming. During zooming, the second lens unit moves and a distance between each adjacent lens units changes. In all lens units of the zoom lens, during zooming the second lens unit moves by a largest moving amount and has a largest zooming ratio between a wide-angle end and a telephoto end. Predetermined conditions are satisfied.

An image pickup apparatus including the zoom lens also constitutes another aspect of the embodiments.

Further features of the present disclosure will become apparent from the following description of exemplary embodiments with reference to the attached drawings.

DESCRIPTION OF THE EMBODIMENTS

Figure 1:
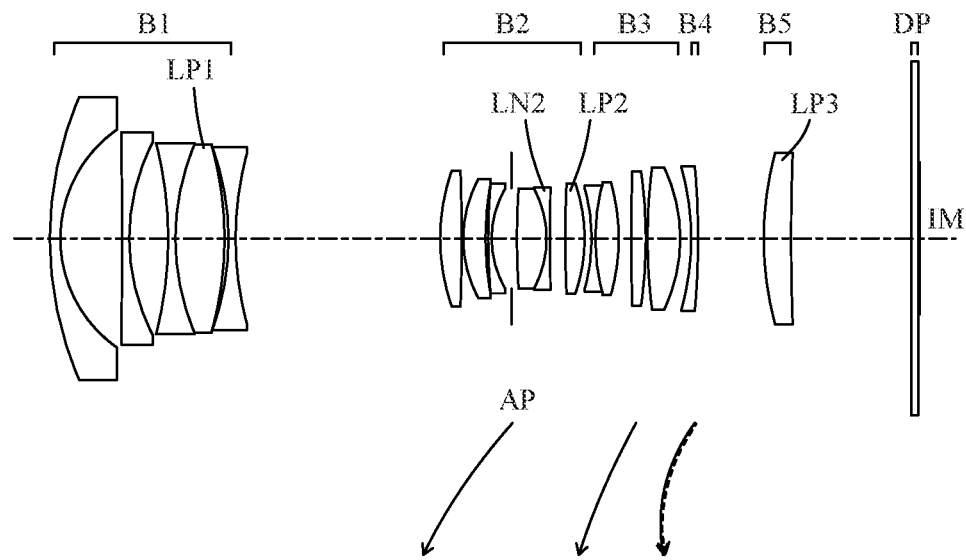
FIG. 1 is a sectional view of a zoom lens according to Example 1.
Figure 2A:
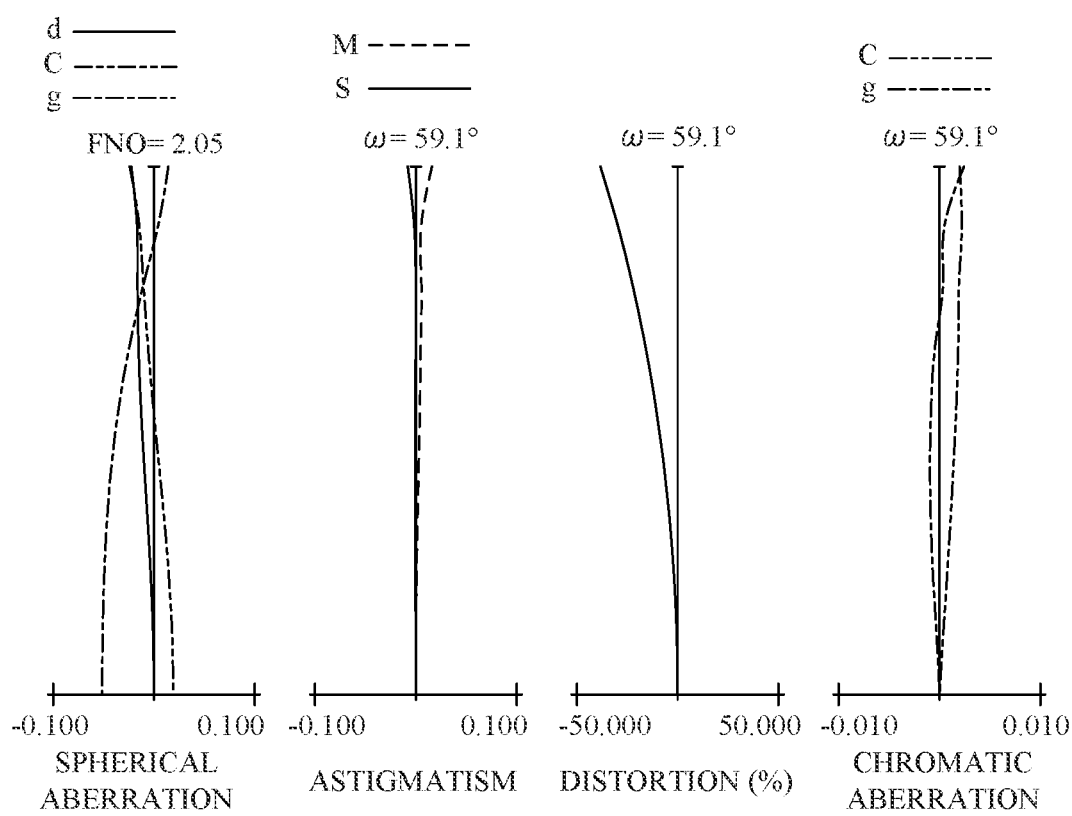
FIGS. 2A to 2C are aberration diagrams at a wide-angle end, a middle zoom position, and a telephoto end of the zoom lens according to Example 1.
Figure 2B:
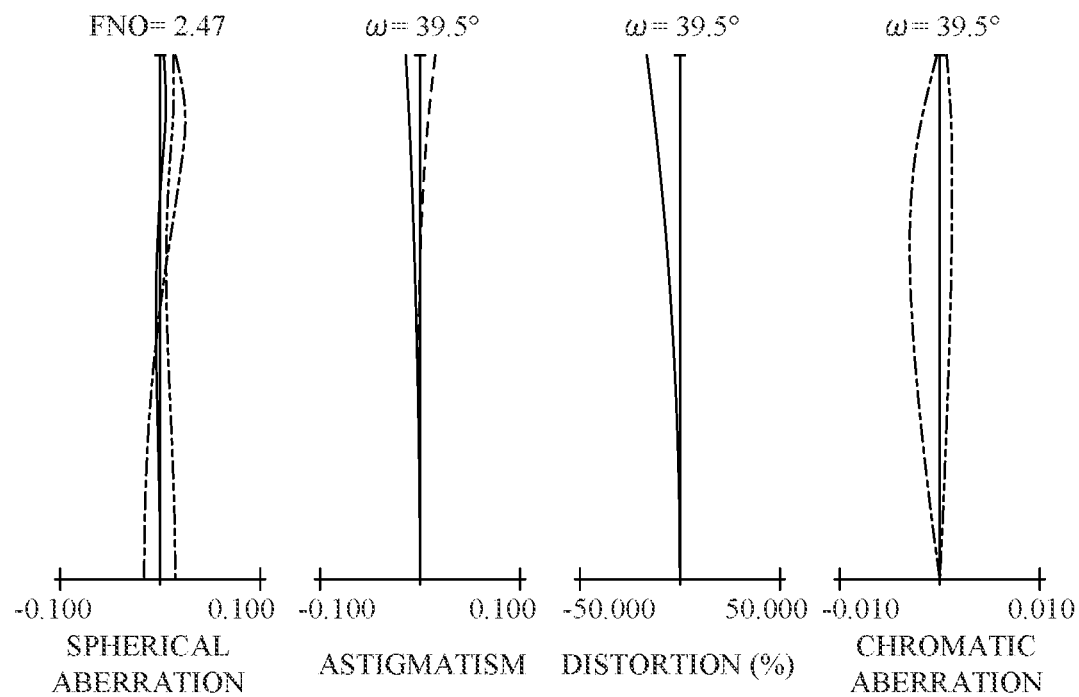
Figure 2C:
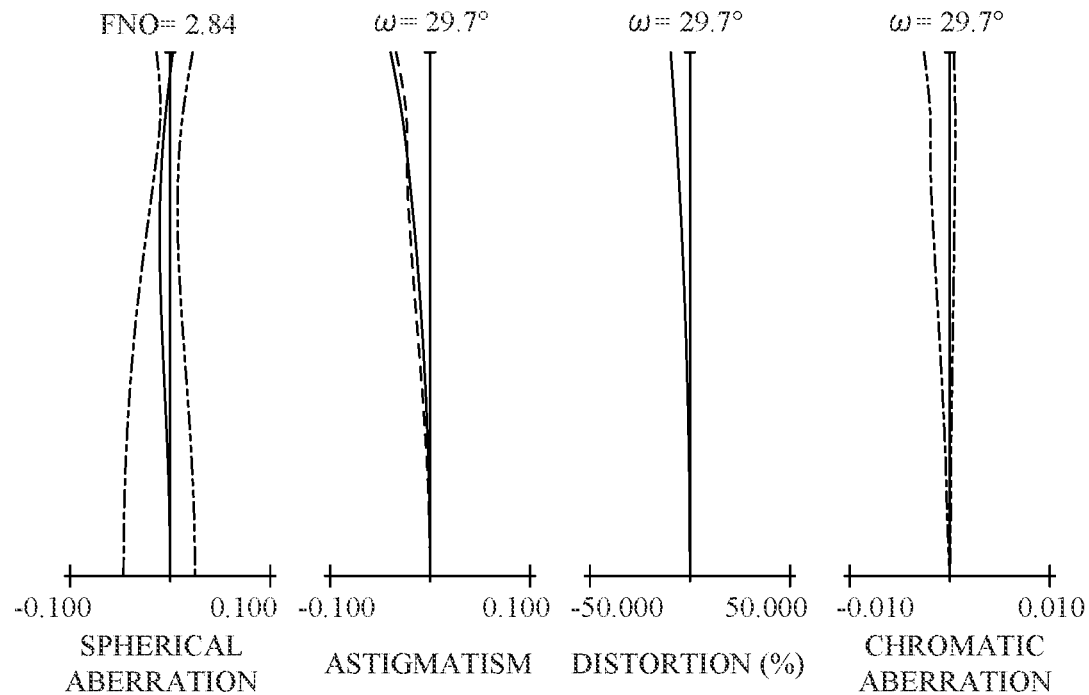
Figure 3:
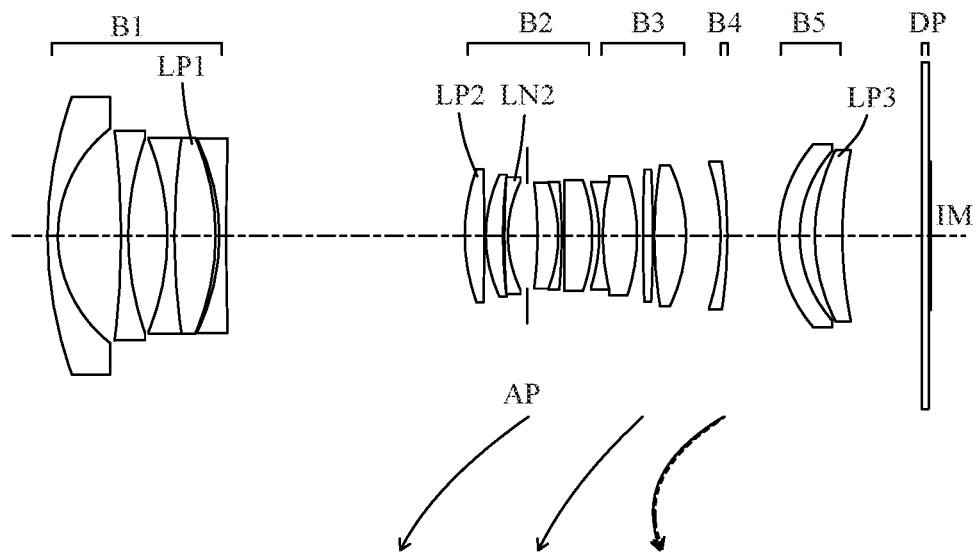
FIG. 3 is a sectional view of a zoom lens according to Example 2.
Figure 4A:
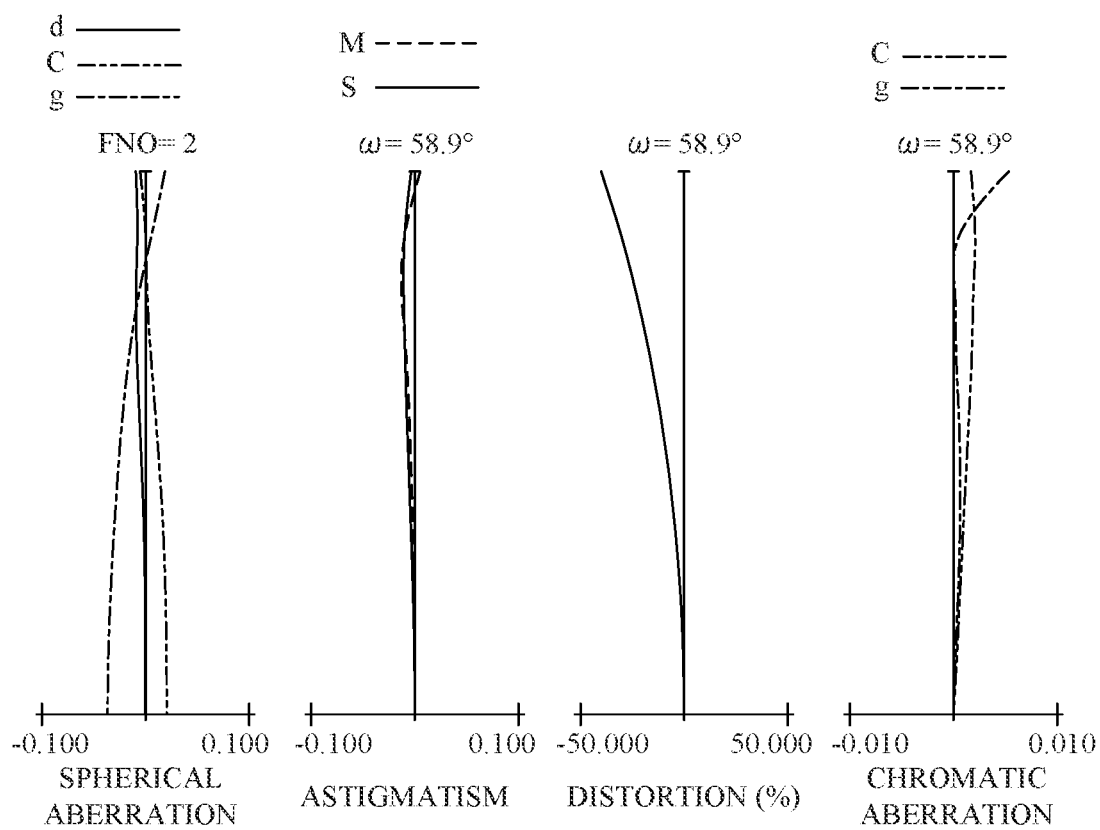
FIGS. 4A to 4C are aberration diagrams at a wide-angle end, a middle zoom position, and a telephoto end of the zoom lens according to Example 2.
Figure 4B:
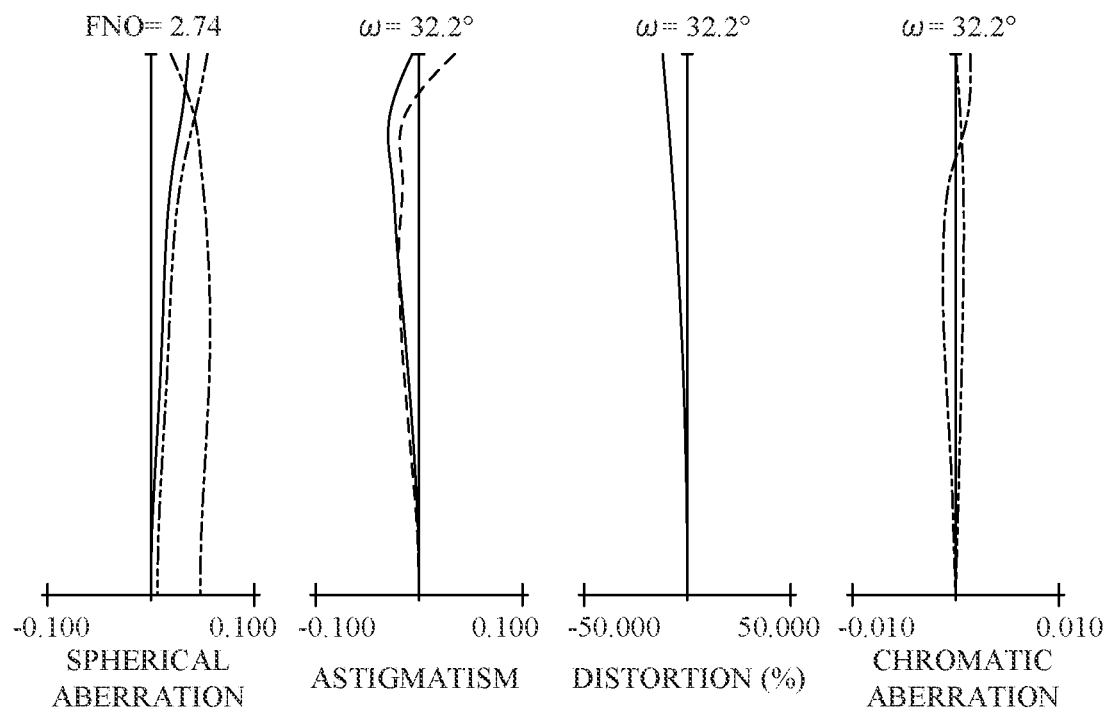
Figure 4C:
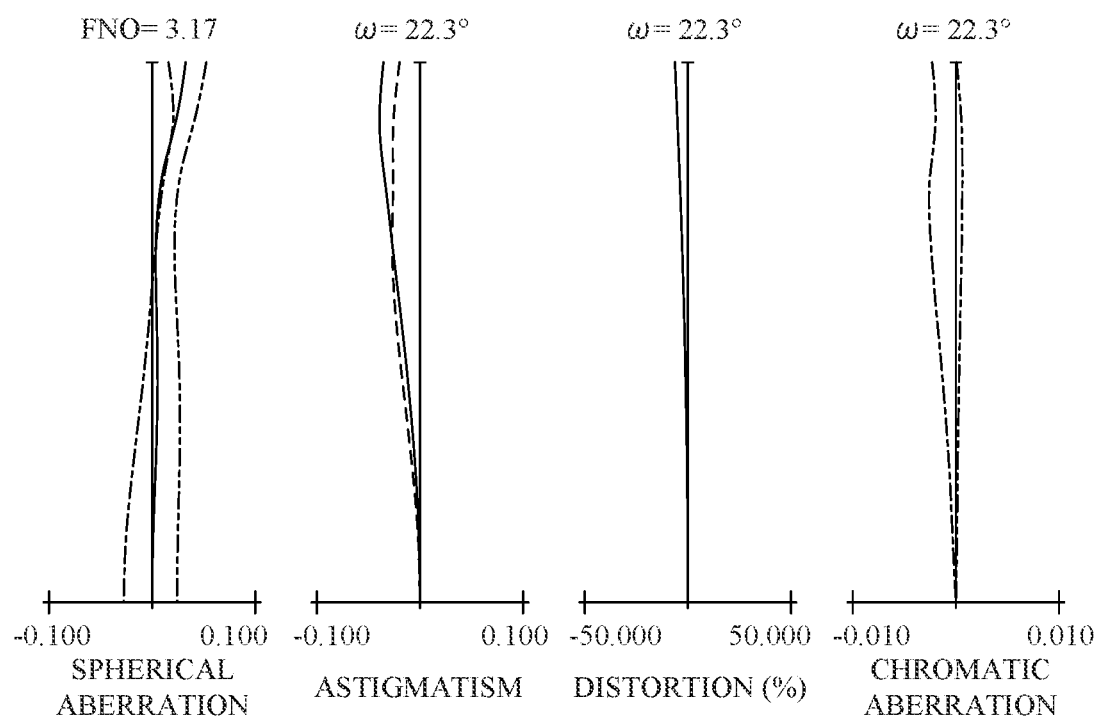
Figure 5:
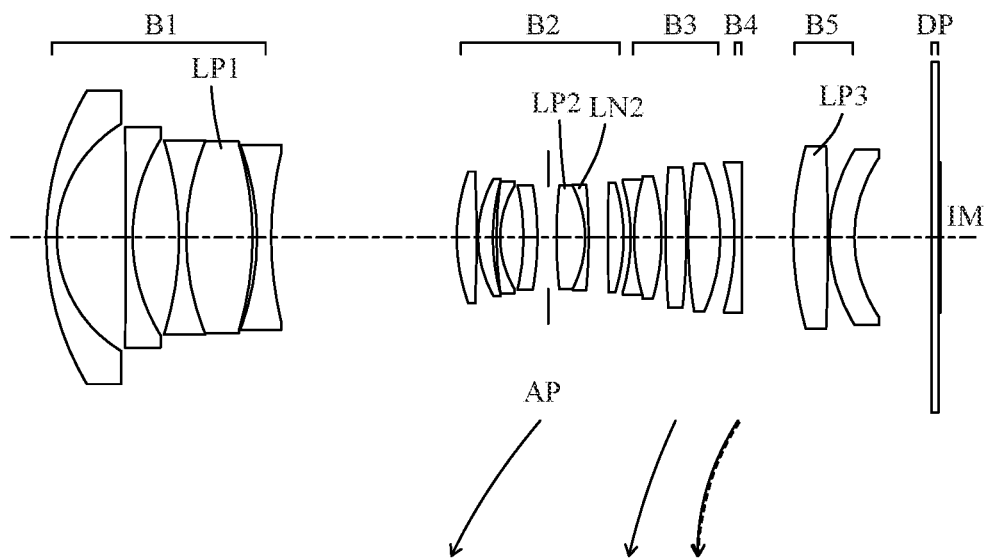
FIG. 5 is a sectional view of a zoom lens according to Example 3.
Figure 6A:
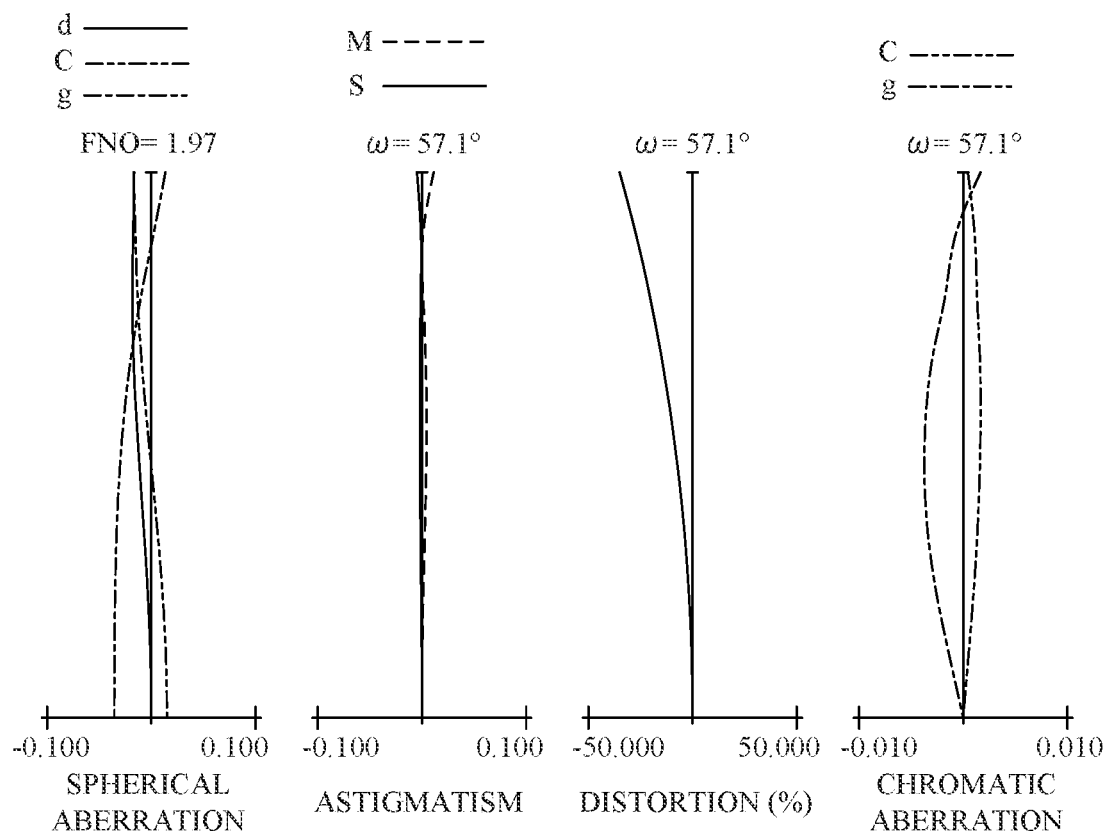
FIGS. 6A to 6C are aberration diagrams at a wide-angle end, a middle zoom position, and a telephoto end of the zoom lens according to Example 3.
Figure 6B:
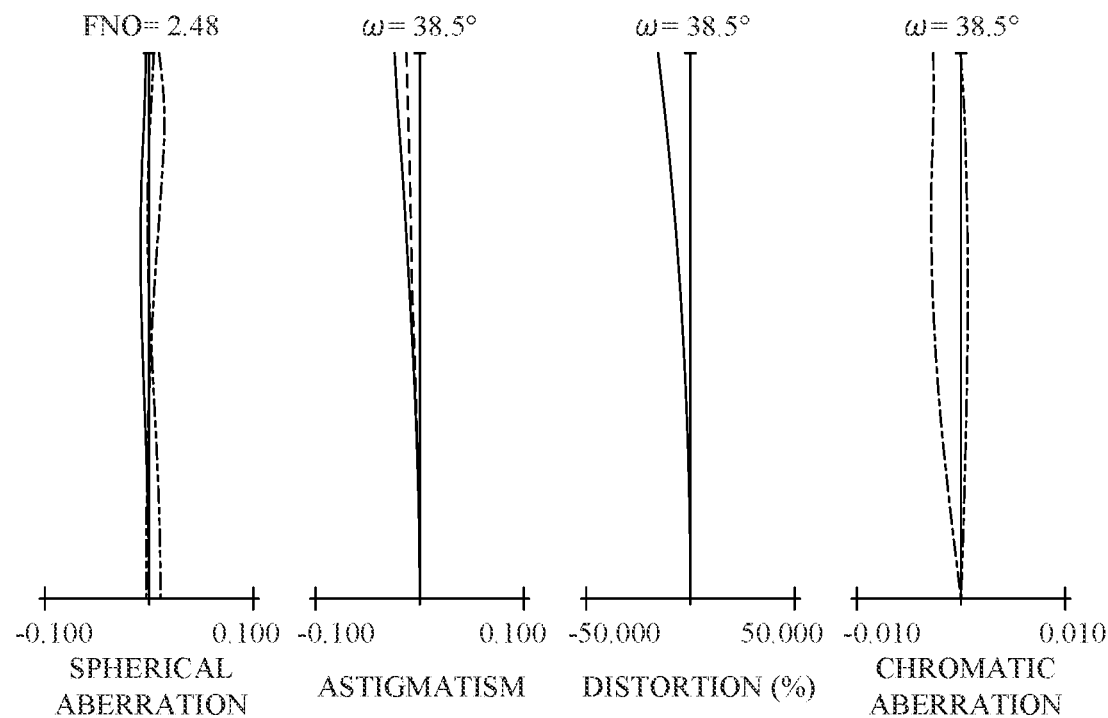
Figure 6C:
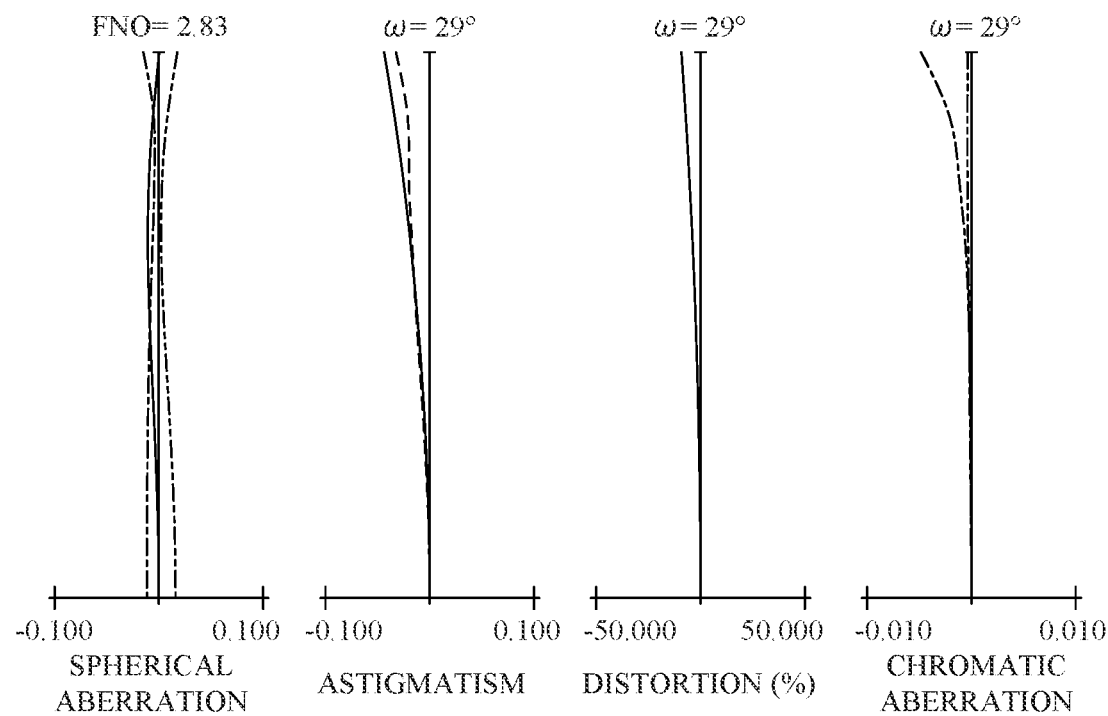
Figure 7:
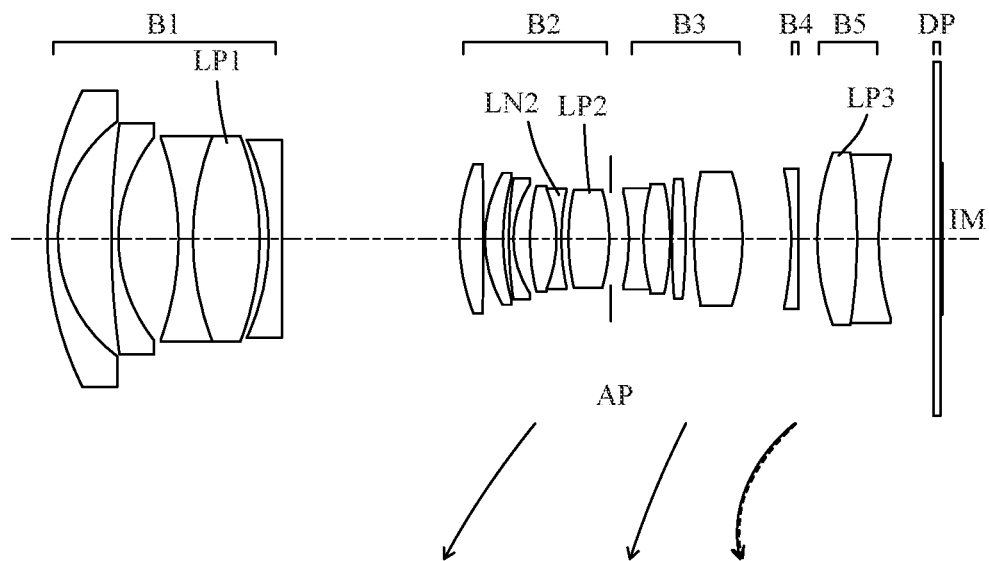
FIG. 7 is a sectional view of a zoom lens according to Example 4.
Figure 8A:
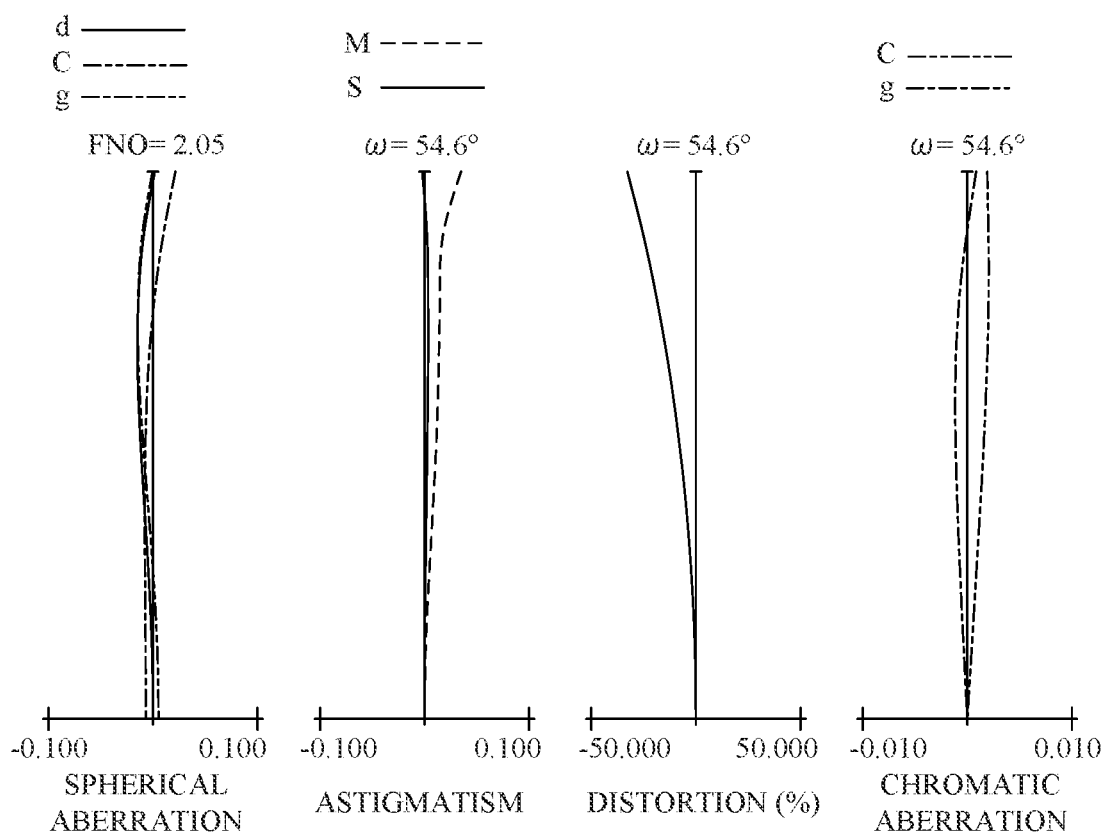
FIGS. 8A to 8C are aberration diagrams at a wide-angle end, a middle zoom position, and a telephoto end of the zoom lens according to Example 4.
Figure 8B:
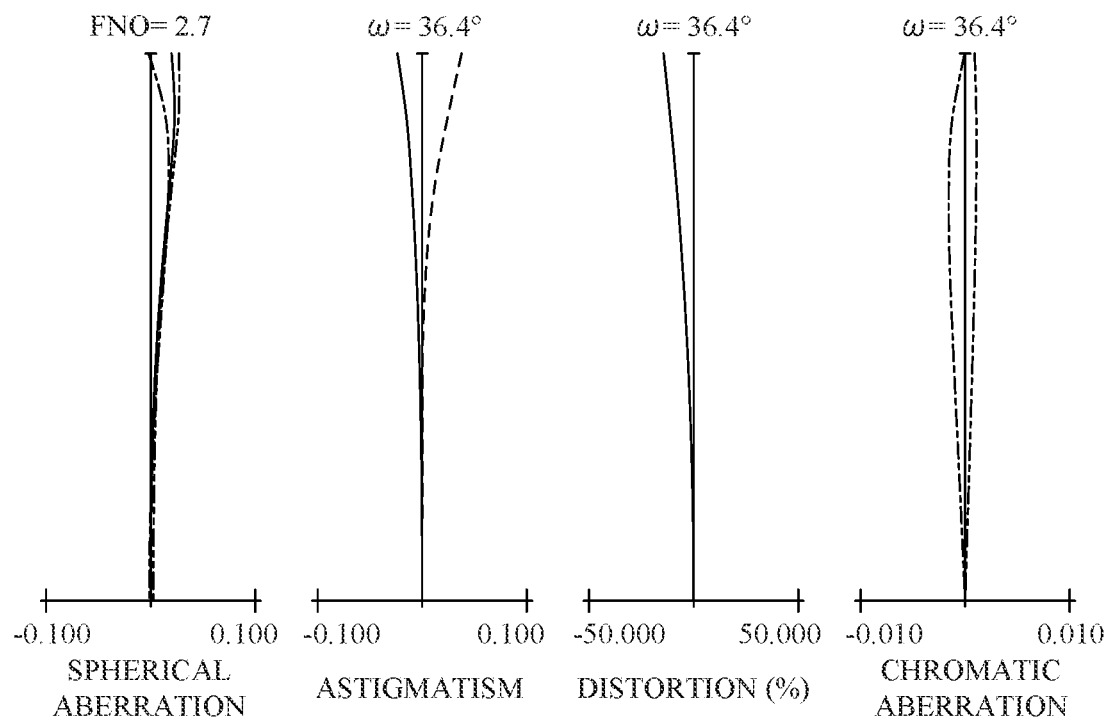
Figure 8C:
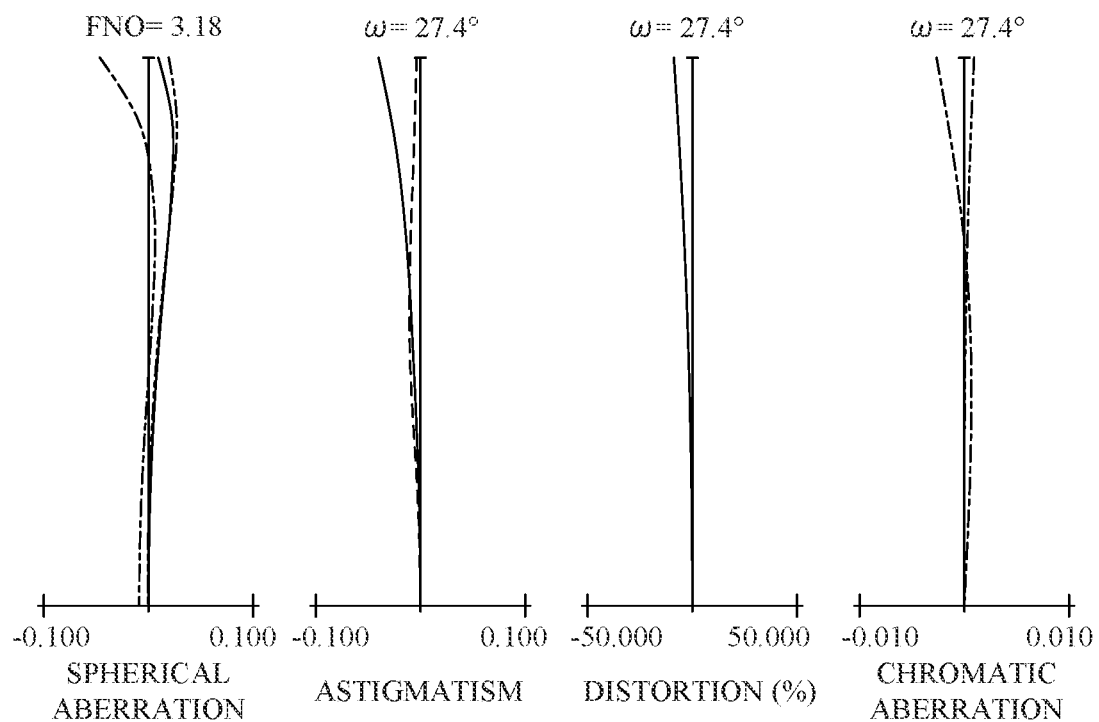
Figure 9:
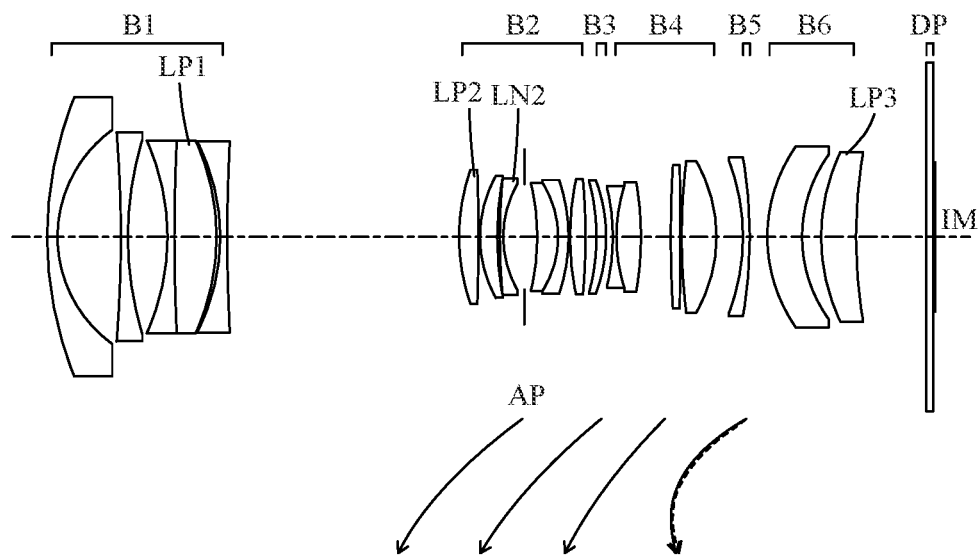
FIG. 9 is a sectional view of a zoom lens according to Example 5.
Figure 10A:
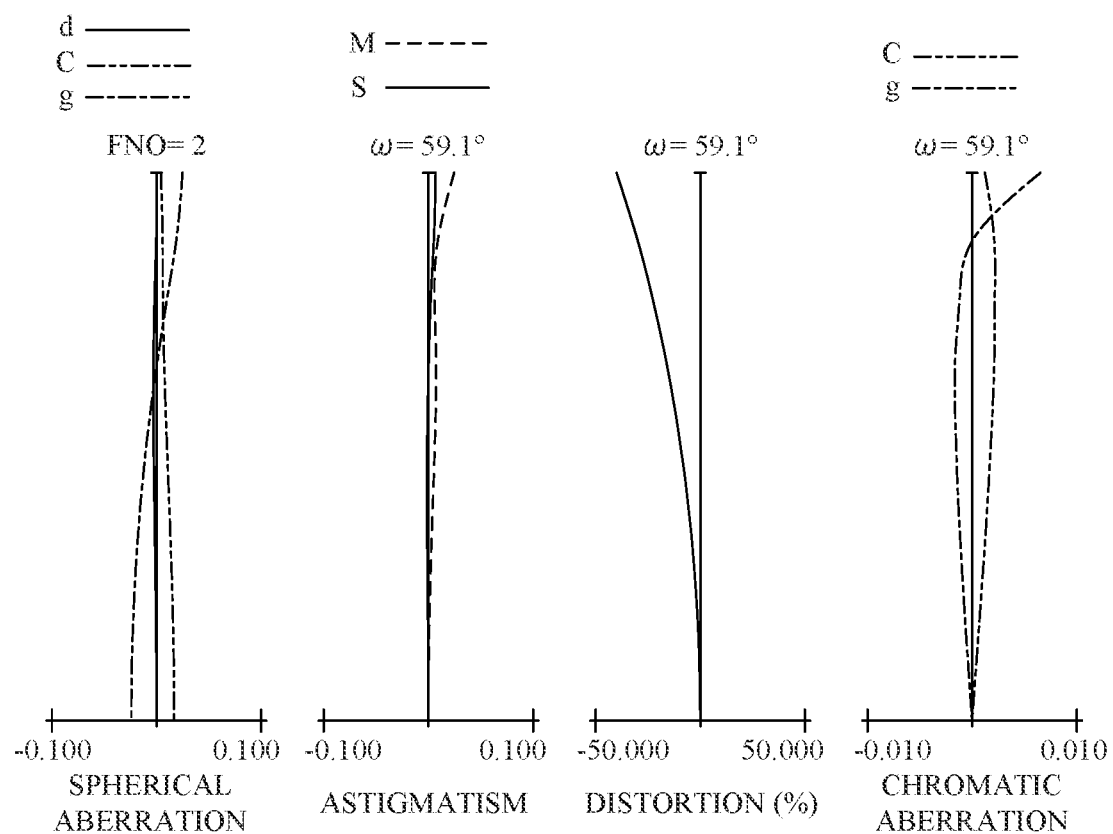
FIGS. 10A to 10C are aberration diagrams at a wide-angle end, a middle zoom position, and a telephoto end of the zoom lens according to Example 5.
Figure 10B:
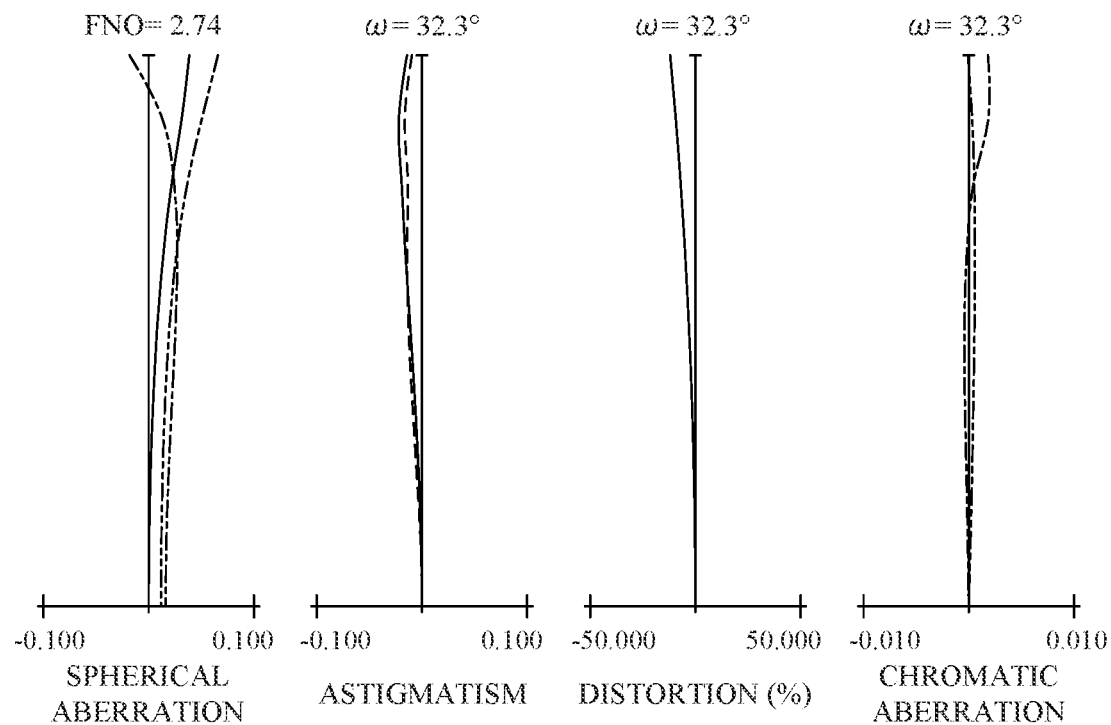
Figure 10C:
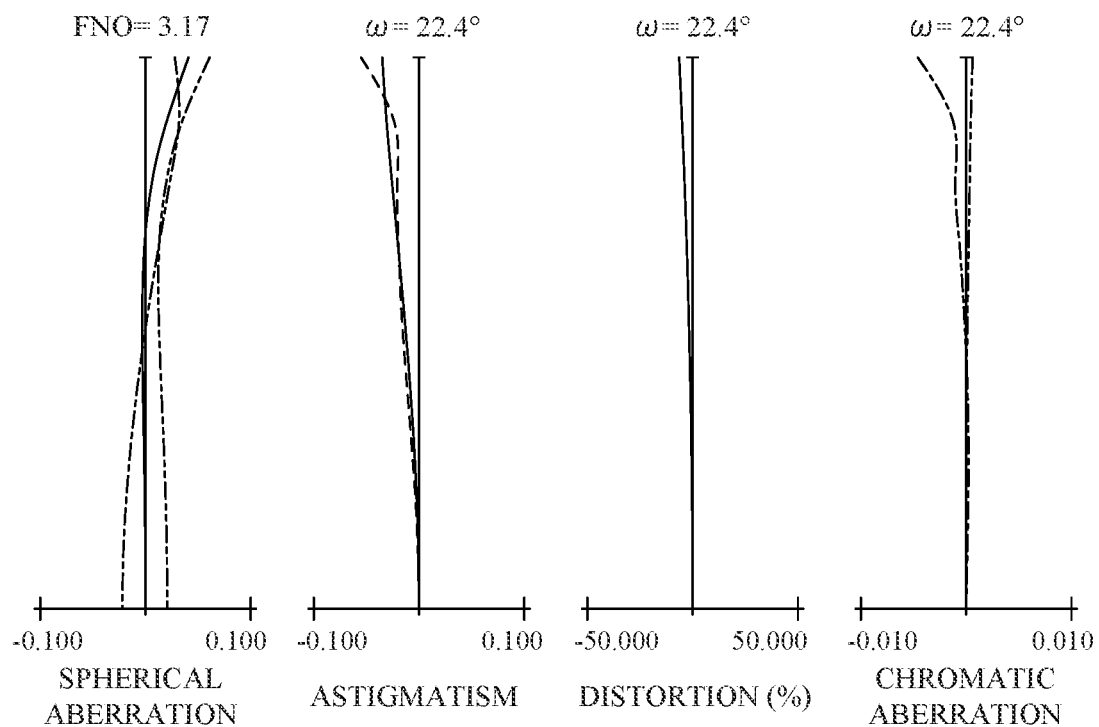
Figure 11:
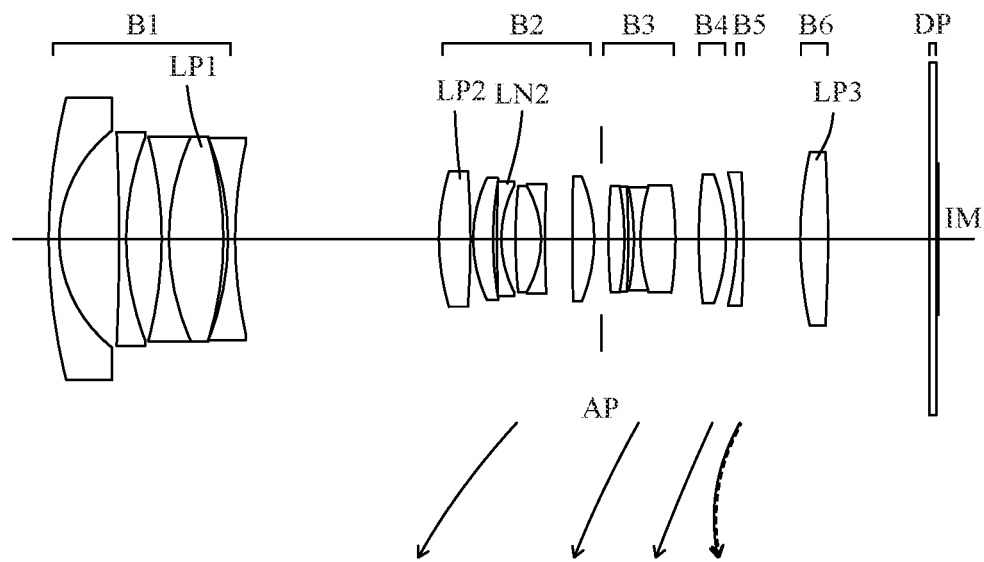
FIG. 11 is a sectional view of a zoom lens according to Example 6.
Figure 12A:
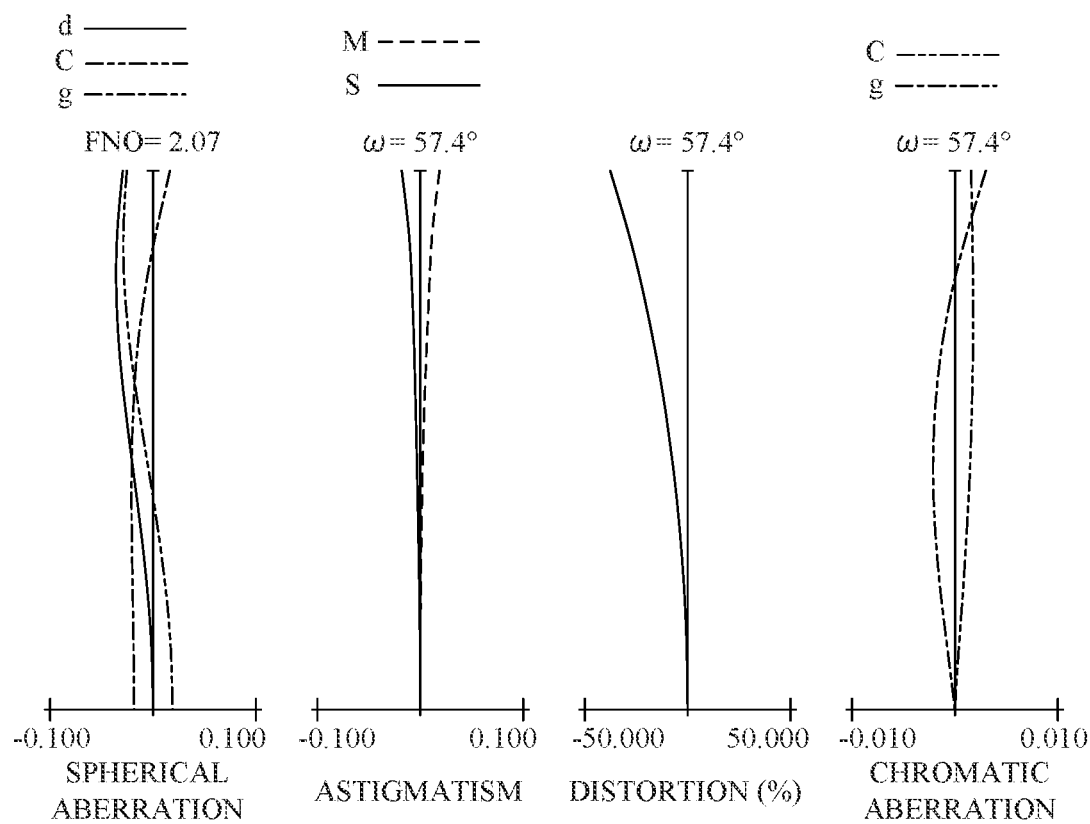
FIGS. 12A to 12C are aberration diagrams at a wide-angle end, a middle zoom position, and a telephoto end of the zoom lens according to Example 6.
Figure 12B:
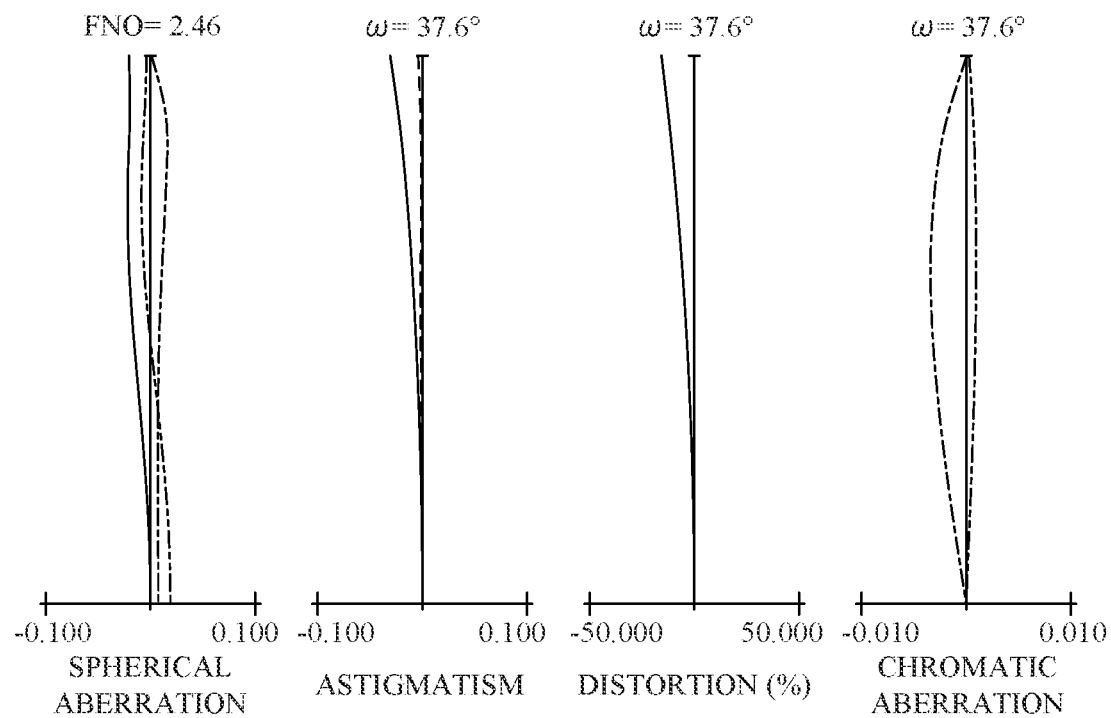
Figure 12C:
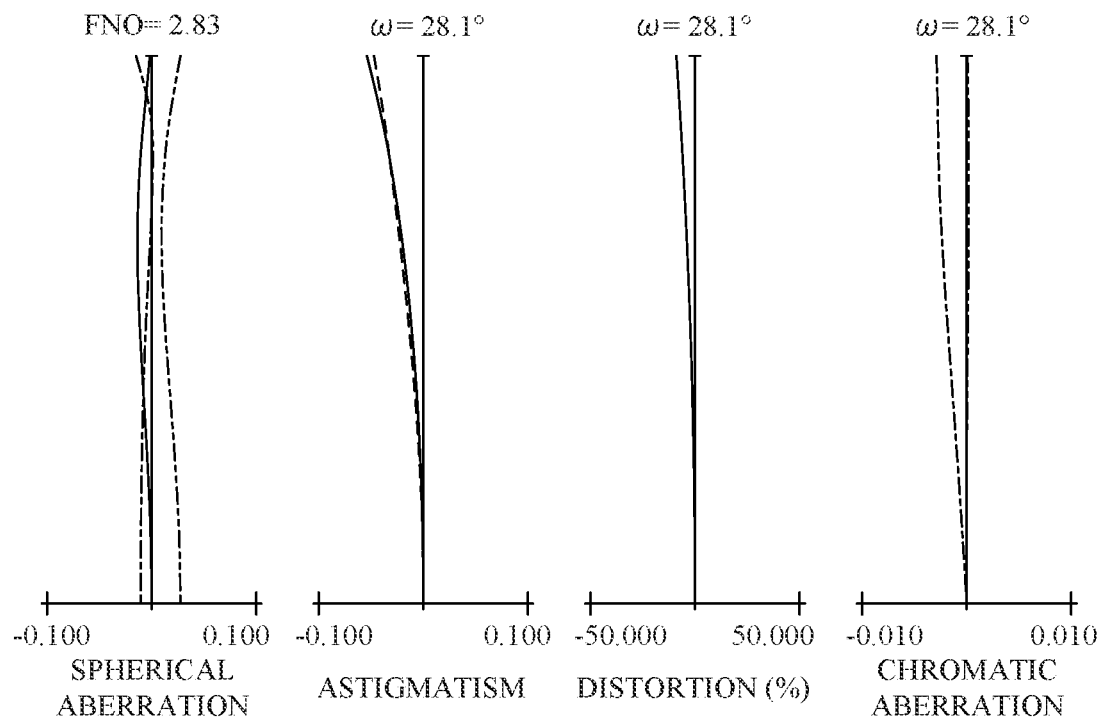

Referring now to the accompanying drawings, a description will be given of embodiments of the present disclosure.

First, prior to specific descriptions of Examples 1 to 6, a description is given of matters common to the examples. A zoom lens according to each example is used as an image pickup lens for various image pickup apparatuses such as digital still cameras, video cameras, broadcasting cameras, surveillance cameras, and silver-halide film cameras. The image pickup lens may be interchangeable with respect to the image pickup apparatus or may be provided integrally with the image pickup apparatus. The zoom lens according to each example can also be used as a projection optical system for an image projection apparatus (projector).

The zoom lens according to each example is a negative lead type zoom lens including, in order from an object side to an image side, a first lens unit having a negative refractive power, a second lens unit having a positive refractive power, a middle group including two or more lens units, and a rear group that includes one or more lens units and has a positive refractive power. Since the negative first lens unit and the positive second lens unit are arranged on the object side, the zoom lens according to each example is beneficial to a wide angle of view.

A "lens unit" is a group of one or more lenses that integrally move as a whole during zooming (magnification variation) between the wide-angle end and the telephoto end. That is, each distance between adjacent lens units changes during zooming. A lens unit may include an aperture diaphragm. A wide-angle end and a telephoto end are respective zooming states with a largest angle of view (shortest focal length) and a smallest angle of view (longest focal length) in which each lens unit that moves during zooming is located at one end and the other end of a mechanically or controllably movable range on an optical axis.

In the zoom lens according to each example, during zooming, the first lens unit does not move (is fixed), the second lens unit and at least one middle lens unit move, and each distance between adjacent lens units changes. Since zooming is performed by the second lens unit and the lens unit on the image side of the second lens unit, it is possible to correct an image plane variation caused by zooming as well as various aberration fluctuations during zooming.

In each example, zooming is mainly performed by the second lens unit. That is, when it is assumed that a magnification variation ratio (zooming ratio) of a lens unit is an absolute value of a value acquired by dividing a lateral magnification at the telephoto end of the lens unit by a lateral magnification at the wide-angle end of the lens unit, the magnification variation ratio of the second lens unit is the largest in the magnification variation ratios of all lens units.

During zooming, at least one middle lens unit (hereinafter also referred to as a "focus lens unit") moves mainly to correct an image plane variation. The focus lens unit also moves during focusing on an object at each distance from an infinite distance to a closest distance. A middle lens unit other than the focus lens unit includes a lens unit that moves to more accurately correct aberration fluctuations during zooming.

The rear group having the positive refractive power corrects lateral chromatic aberration occurring in the first lens unit in which the height of an off-axis light beam is high, and reduces angles of rays entering the image plane.

In each example, during zooming between the wide-angle end and the telephoto end, the moving amount of the second lens unit is the largest in moving amounts of the lens units each of which moves during the zooming. The "moving amount" of the second lens unit here is an absolute value of a difference between positions at the wide-angle end and the telephoto end of a lens surface in the second lens unit.

In each example, the second lens unit includes at least one positive lens and at least one negative lens. In a case where the second lens unit includes a cemented lens in which a positive lens and a negative lens are cemented, the positive lens and the negative lens are assumed to be single lenses that are not cemented. The zoom lens according to each example satisfies conditions of the following inequalities (1) and (2), where f2p represents the shortest focal length in a focal length of a positive lens included in the second lens unit, f2n represents the shortest focal length in a focal length of a negative lens included in the second lens unit, and f2 represents a focal length of the second lens unit.

$$0.65 \leq f2p/f2 \leq 2.00 \quad (1)$$

$$-0.85 \leq f2n/f2 < 0 \quad (2)$$

If f2p/f2 is smaller than the lower limit value of the inequality (1), a refractive power of the second lens unit is so small that the moving amount of the second lens unit during zooming increases, making it difficult to reduce the size of the zoom lens. If f2p/f2 is larger than the upper limit value of the inequality (1), the refractive power of the second lens unit is too large to correct aberration well.

The upper limit value of the inequality (2) is determined by the refractive power of the second lens unit being positive and f2n being a negative focal length. If f2n/f2 is smaller than the lower limit value of the inequality (2), the power of the negative lens included in the second lens unit is too small to sufficiently correct various aberrations, especially spherical aberration and coma. By reducing the aberration of the second lens unit, which is a main zooming unit, an aberration fluctuation during zooming can be further reduced.

By having the above-described configuration and satisfying the conditions of the inequalities (1) and (2), a zoom lens becomes beneficial to a wide angle of view, a small size, and optical performance supporting a high resolution.

The numerical ranges of the inequalities (1) and (2) may be set as follows.

$$0.68 \leq f2p/f2 \leq 1.50 \quad (1a)$$

$$-0.80 \leq f2n/f2 < 0 \quad (2a)$$

The numerical ranges of the inequalities (1) and (2) may be set as follows.

$$0.72 \leq f2p/f2 \leq 0.90 \quad (1b)$$

$$-0.76 \leq f2n/f2 < 0 \quad (2b)$$

The zoom lens according to each example may satisfy at least one of the conditions of the following inequalities (3) to (9).

The focal lengths f2p and f2n may satisfy a condition of the following inequality (3).

$$-2.00 \leq f2p/f2n \leq -0.95 \quad (3)$$

If f2p/f2n does not satisfy the numerical range of the inequality (3), various aberrations, especially spherical aberration and coma, caused by the second lens unit may worsen.

Furthermore, a condition of the following inequality (4) may be satisfied, where m2 represents a moving amount of the second lens unit between the wide-angle end and the telephoto end, and m3 represents a moving amount of the third lens unit between the wide-angle end and the telephoto end, the third lens unit being included in the middle group and disposed at a position adjacent to the second lens unit on the image side.

$$1.0 < m2/m3 \leq 2.5 \quad (4)$$

An aperture diaphragm may be provided in either the second lens unit or the third lens unit while the condition of the inequality (4) is satisfied. In this case, it is possible to reduce a variation in height of a light beam in the second lens unit during zooming, making it easier to reduce an aberration fluctuation during zooming.

The zoom lens according to each example as a negative lead type zoom lens suitable for widening the angle of view may satisfy a condition of the following inequality (5) where f1 represents a focal length of the first lens unit.

$$-0.85 \leq f1/f2 \leq -0.55 \quad (5)$$

If f1/f2 is smaller than the lower limit value of the inequality (5), the negative refractive power of the first lens unit may be too weak to widen the angle of view well. If f1/f2 is larger than the upper limit value of the inequality (5), the negative refractive power of the first lens unit may be too strong to correct on-axis chromatic aberration well.

In order that on-axis chromatic aberration is corrected, the first lens unit may include at least one positive lens and may satisfy the following inequalities (6) and (7) where vd1p represents an Abbe number with respect to a d-line of the at least one positive lens, and the θgF1p represents a partial dispersion ratio with respect to a g-line and an F-line of the positive lens.

$$vd1p \leq 40 \quad (6)$$

$$\theta gF1p + 0.00162 \times vd1p - 0.64146 \leq 0.006 \quad (7)$$

Since the first lens unit has the negative refractive power, at least one positive lens in the first lens unit may have a high dispersion that satisfies the condition of the inequality (6) in order that on-axis chromatic aberration is corrected. Moreover, the condition of the inequality (7) may be satisfied when secondary spectrum is taken into consideration. The Abbe number vd1p is expressed by the following equation where nd, nF, and nC respectively represent refractive indexes of the positive lens (material of the positive lens) with respect to the d-line (wavelength 587.6 nm), the F-line (wavelength 486.1 nm) and a C-line (wavelength 656.3 nm).

$$vd1p = (nd-1)/(nF-nC)$$

The partial dispersion ratio θgF1p is expressed by the following equation where ng, nF, and nC respectively represent refractive indexes of the positive lens with respect to the g-line (wavelength 435.8 nm), the F-line, and the C-line.

$$\theta gF1p = (ng-nF)/(nF-nC)$$

The positive lens in the first lens unit may be cemented to a negative lens so that on-axis chromatic aberration is corrected.

The condition of the following inequality (8) may be satisfied where Ndp represents a maximum refractive index in a refractive index of the at least one positive lens in the rear group having the positive refractive power.

$$1.85 \leq Ndp \quad (8)$$

If Ndp is lower than the lower limit value of the numerical range of the inequality (8), a curvature of each surface of the positive lens is so large that various aberrations increase.

An Abbe number vdp with respect to the d-line of a positive lens having the largest refractive index in the rear group may satisfy a condition of the following inequality (9).

$$vdp \leq 25 \quad (9)$$

By satisfying the condition of the inequality (9) in the rear group that corrects the lateral chromatic aberration, a correction effect can be improved.

Moreover, the middle group may include at least one lens unit having a negative refractive power. By using this negative lens unit as the focus lens unit, a moving amount of the focus lens unit during focusing can be reduced, and the size of the zoom lens can be further reduced.

The numerical ranges of the inequalities (3) to (9) may be set as follows.

$$-1.90 \leq f2p/f2n \leq -0.97 \quad (3a)$$

$$1.0 < m2/m3 \leq 2.2 \quad (4a)$$

$$-0.80 \leq f1/f2 \leq -0.56 \quad (5a)$$

$$vd1p \leq 39 \quad (6a)$$

$$\theta gF1p + 0.00162 \times vd1p - 0.64146 \leq 0.004 \quad (7a)$$

$$1.90 \leq Ndp \quad (8a)$$

$$vdp \leq 23 \quad (9a)$$

The numerical ranges of the inequalities (3) to (9) may be set as follows.

$$-1.80 \leq f2p/f2n \leq -0.98 \quad (3b)$$

$$1.0 < m2/m3 \leq 1.9 \quad (4b)$$

$$-0.76 \leq f1/f2 \leq -0.57 \quad (5b)$$

$$vd1p \leq 38 \quad (6b)$$

$$\theta gF1p + 0.00162 \times vd1p - 0.64146 \leq 0.002 \quad (7b)$$

$$1.95 \leq Ndp \quad (8b)$$

$$vdp \leq 21 \quad (9b)$$

Next, a description is given of Examples 1 to 6. FIG. 1, FIG. 3, FIG. 5, FIG. 7, FIG. 9, and FIG. 11 respectively illustrate configurations of the zoom lenses at wide-angle ends according to Examples 1 to 6. Each of the zoom lenses according to Examples 1 to 4 includes, in order from the object side to the image side, a first lens unit B1 having a negative refractive power, a second lens unit B2 having a positive refractive power, a middle group including a third lens unit B3 having a positive refractive power and a fourth lens unit B4 having a negative refractive power, and a fifth lens unit B5 having a positive refractive power as a rear group. The zoom lens according to Example 5 includes a first lens unit B1 having a negative refractive power, a second lens unit B2 having a positive refractive power, a middle group including a third lens unit B3 having a positive refractive power, a fourth lens unit B4 having a positive refractive power, and a fifth lens unit B5 having a negative refractive power, and a sixth lens unit B6 having a positive refractive power as a rear group. The zoom lens according to Example 6 includes a first lens unit B1 having a negative refractive power, a second lens unit B2 having a positive refractive power, a middle group including a third lens unit B3 having a negative refractive power, a fourth lens unit B4 having a positive refractive power, and a fifth lens unit B5 having a negative refractive power, and a sixth lens unit B6 having a positive refractive power as a rear group.

In each drawing, AP denotes an aperture diaphragm. In each of Examples 1 to 5, the second lens unit B2 includes the aperture diaphragm AP, and in Example 6, the third lens unit B3 includes the aperture diaphragm AP.

DP denotes a glass block such as a cover glass and a low-pass filter provided in an image sensor such as a CCD sensor and a CMOS sensor. IM denotes an image plane, and an image pickup plane of the image sensor is disposed on the image plane IM. In a silver-halide film camera, a film surface (photosensitive surface) of a silver-halide film is disposed on the image plane IM.

In each example, the first lens unit B1 includes a positive lens LP1. The second lens unit B2 includes a positive lens LP2 having the shortest focal length in a positive lens included in the second lens unit B2 and a negative lens LN2 having the shortest focal length in a negative lens included in the second lens unit B2. The rear group includes a positive lens LP3 having the largest refractive power in the positive lenses included in the rear group.

In each drawing, an arrow is illustrated below each lens unit that moves during zooming, the arrow indicating a movement trajectory of that lens unit during zooming from the wide-angle end to the telephoto end. In each of Examples 1 to 4, the second lens unit B2, the third lens unit B3, and the fourth lens unit B4 move toward the object side during zooming from the wide-angle end to the telephoto end. In each of Examples 5 and 6, the second lens unit B2, the third lens unit B3, the fourth lens unit B4, and the fifth lens unit B5 move toward the object side during zooming from the wide-angle end to the telephoto end.

Each of the fourth lens units B4 in Examples 1 to 4 and the fifth lens units B5 in Examples 5 and 6 moves so as to compensate for an image plane variation during zooming. Solid and dashed lines are illustrated below each of these lens units in the drawing, the solid and dashed lines respectively indicating the movement trajectories of the lens unit during zooming in cases where an infinite distance object and a short distance object are focused on. The fourth lens units B4 in Examples 1 to 4 and the fifth lens units B5 in Examples 5 and 6 move as focus lens units during focusing. Specifically, each of these lens units moves toward the image side during focusing from an infinite distance object to a short distance object.

Numerical Examples 1 to 6 respectively corresponding to Examples 1 to 6 are provided in Tables 1 to 6. In each Numerical Example, f represents a focal length (mm), Fno represents an F number, and ω represents a half angle of view (°).

The surface number i represents an order of a surface counted from the object side. r represents a radius (mm) of curvature of an i-th surface from the object side, d represents a lens thickness or an air distance (mm) between the i-th and (i+1)-th surfaces, and n represents a refractive index with respect to the d-line of an optical material between the i-th and (i+1)-th surfaces. ν represents an Abbe number with respect to the d-line of the optical material between the i-th surface and the (i+1)-th surface.

"*" attached to the surface number indicates that the surface has an aspherical shape. The shape of the aspherical surface is expressed by the following equality where z represents an amount of displacement (sag) from a surface vertex in an optical axis direction, y represents a height from the optical axis in a direction orthogonal to the optical axis, a traveling direction of light is assumed to be positive, r represents a paraxial radius of curvature, k represents a conic constant, and Bj (j=1 to 16) represents an aspherical coefficient.

$$z = \frac{\frac{y^2}{r}}{1 + \sqrt{1 - (1+k)\left(\frac{y}{r}\right)^2}} + \sum_{j=1}^{16} B_j y^j$$

In each table, "E±x" represents "$10^{\pm x}$". All coefficients not specified are 0.

Table 7 summarizes values corresponding to the above-described inequalities (1) to (9) in Numerical Examples 1 to 6.

FIGS. 2A, 4A, 6A, 8A, 10A, and 12A illustrate longitudinal aberrations (spherical aberration, astigmatism, distortion, and chromatic aberration) at wide-angle ends according to Numerical Examples 1 to 6, FIGS. 2B, 4B, 6B, 8B, 10B, and 12B illustrate longitudinal aberrations at middle zoom positions according to Numerical Examples 1 to 6, and FIGS. 2C, 4C, 6C, 8C, 10C, and 12C illustrate longitudinal aberrations at telephoto ends according to Numerical Examples 1 to 6. In each spherical aberration diagram, Fno denotes an F-number, a solid line represents spherical aberration with respect to the d-line, a two-dot chain line represents spherical aberration with respect to the C-line, and a one-dot chain line represents spherical aberration with respect to the g-line. Separation amounts at the bottom indicate on-axis chromatic aberration. In each astigmatism diagram, a solid line S represents a sagittal image plane, and a dashed line M represents a meridional image plane. Each distortion diagram illustrates distortion with respect to the d-line. In each chromatic aberration diagram, a two-dot chain line represents lateral chromatic aberration with respect to the C-line, and a one-dot chain line represents lateral chromatic aberration with respect to the g-line. ω denotes a half angle of view (°).

The zoom lens configurations in Examples 1 to 6 are mere examples, and the number of lenses in each lens unit, the number of aspherical lenses, or the number of lens units included in the middle group may be changed. In addition, each of the zoom lenses according to Examples 1 to 6 is a zoom lens having a lens unit arrangement of, from the object side, negative, positive, positive, negative, and positive, a lens unit arrangement of negative, positive, positive, positive, negative, and positive, or a lens unit configuration of negative, positive, negative, positive, negative, and positive, but other lens unit arrangement may be used.

TABLE 1

(NUMERICAL EXAMPLE 1)

|  | Wide-Angle End | Middle | Telephoto End |
|---|---|---|---|
| f | 10.41 | 15.61 | 20.81 |
| Fno | 2.05 | 2.47 | 2.84 |
| ω | 59.1 | 39.5 | 29.7 |
| Zoom Ratio | | 2.00 | |

| Surface No. | Paraxial Radius of Curvature r[mm] | Surface Distance d[mm] | Refractive Index n | Abbe No. ν |
|---|---|---|---|---|
| 1 | 49.87 | 1.50 | 1.892 | 37.13 |
| 2 | 18.85 | 8.76 | — | — |
| 3 | −852.57 | 1.00 | 1.595 | 67.74 |
| 4 | 29.47 | 5.54 | — | — |
| 5 | −53.42 | 1.00 | 1.497 | 81.55 |
| 6 | 33.98 | 6.97 | 1.916 | 31.60 |
| 7 | −47.83 | 0.56 | — | — |
| 8 | −37.23 | 1.00 | 1.439 | 94.66 |
| 9 | 45.99 | Variable | — | — |
| 10 | 28.87 | 3.06 | 2.0010 | 29.13 |
| 11 | −234.57 | 0.20 | — | — |
| 12 | 17.52 | 3.15 | 1.804 | 46.53 |
| 13 | 41.29 | 0.38 | — | — |
| 14 | 85.36 | 0.50 | 1.916 | 31.60 |
| 15 | 13.94 | 2.80 | — | — |
| AP 16 | ∞ | 0.77 | — | — |
| 17 | 95.73 | 4.23 | 1.497 | 81.55 |
| 18 | −14.76 | 0.50 | 1.916 | 31.60 |
| 19 | 798.86 | 2.13 | — | — |
| 20 | 149.67 | 2.76 | 1.835 | 42.74 |
| 21 | −23.44 | Variable | — | — |
| 22 | −25.60 | 0.50 | 1.916 | 31.60 |
| 23 | 29.36 | 3.32 | 1.497 | 81.55 |
| 24 | −28.74 | 1.76 | — | — |
| 25 | 283.74 | 2.09 | 1.892 | 37.13 |
| 26 | −65.17 | 0.20 | — | — |
| 27 | 74.04 | 4.67 | 1.439 | 94.66 |
| 28 | −23.31 | Variable | — | — |
| 29 | −37.07 | 1.00 | 1.916 | 31.60 |
| 30 | −103.43 | Variable | — | — |
| 31 | 46.25 | 3.89 | 1.986 | 16.48 |
| 32 | 324.40 | 16.99 | — | — |
| 33 | ∞ | 1.00 | 1.516 | 64.14 |
| 34 | ∞ | 0.50 | — | — |

Variable Surface Distance d[mm]

| Surface No. | Wide-Angle End | Middle | Telephoto End |
|---|---|---|---|
| 9 | 28.99 | 15.46 | 5.43 |
| 21 | 1.00 | 5.97 | 9.37 |
| 28 | 1.50 | 2.13 | 8.49 |
| 30 | 9.32 | 17.26 | 17.51 |

TABLE 2

(NUMERICAL EXAMPLE 2)

|  | Wide-Angle End | Middle | Telephoto End |
|---|---|---|---|
| f | 10.79 | 19.41 | 28.04 |
| Fno | 2.00 | 2.74 | 3.17 |
| ω | 58.9 | 32.2 | 22.3 |
| Zoom Ratio | | 2.60 | |

| Surface No. | Paraxial Radius of Curvature r[mm] | Surface Distance d[mm] | Refractive Index n | Abbe No. ν |
|---|---|---|---|---|
| 1 | 58.62 | 1.50 | 1.883 | 40.77 |
| 2 | 19.66 | 9.19 | — | — |
| 3 | −118.94 | 1.00 | 1.595 | 67.74 |

TABLE 2-continued (NUMERICAL EXAMPLE 2)

|     | Surface | r | d | n | ν |
|---|---|---|---|---|---|
|    | 4  | 41.38   | 5.69     | —     | —     |
|    | 5  | −36.59  | 1.00     | 1.439 | 94.66 |
|    | 6  | 95.93   | 5.96     | 1.916 | 31.60 |
|    | 7  | −35.42  | 0.55     | —     | —     |
|    | 8  | −31.53  | 1.00     | 1.439 | 94.66 |
|    | 9  | 463.14  | Variable | —     | —     |
|    | 10 | 27.83   | 2.84     | 2.0010| 29.13 |
|    | 11 | −318.94 | 0.20     | —     | —     |
|    | 12 | 20.41   | 2.48     | 1.772 | 49.60 |
|    | 13 | 71.11   | 0.22     | —     | —     |
|    | 14 | 123.97  | 0.50     | 1.916 | 31.60 |
|    | 15 | 17.62   | 2.80     | —     | —     |
| AP | 16 | ∞       | 1.50     | —     | —     |
|    | 17 | −55.33  | 3.00     | 1.595 | 67.74 |
|    | 18 | −20.89  | 0.50     | 1.916 | 31.60 |
|    | 19 | −84.07  | 0.41     | —     | —     |
| *  | 20 | 525.19  | 4.00     | 1.583 | 59.39 |
| *  | 21 | −24.77  | Variable | —     | —     |
|    | 22 | −23.81  | 0.50     | 1.916 | 31.60 |
|    | 23 | 31.24   | 5.00     | 1.497 | 81.55 |
|    | 24 | −26.87  | 0.84     | —     | —     |
|    | 25 | 234.64  | 1.43     | 1.852 | 40.78 |
|    | 26 | −186.52 | 0.20     | —     | —     |
|    | 27 | 61.09   | 4.63     | 1.439 | 94.66 |
|    | 28 | −23.07  | Variable | —     | —     |
|    | 29 | −33.25  | 1.00     | 1.855 | 24.80 |
|    | 30 | −68.99  | Variable | —     | —     |
|    | 31 | 20.05   | 3.00     | 2.0010| 29.13 |
|    | 32 | 18.34   | 2.16     | —     | —     |
|    | 33 | 26.79   | 4.00     | 1.986 | 16.48 |
|    | 34 | 61.59   | 11.49    | —     | —     |
|    | 35 | ∞       | 1.00     | 1.516 | 64.14 |
|    | 36 | ∞       | 0.50     | —     | —     |

Variable Surface Distance d[mm]

| Surface No. | Wide-Angle End | Middle | Telephoto End |
|---|---|---|---|
| 9  | 34.50 | 13.79 | 1.00  |
| 21 | 1.00  | 5.52  | 7.17  |
| 28 | 4.90  | 4.17  | 16.03 |
| 30 | 7.52  | 24.44 | 23.71 |

Aspherical Coefficient

| Surface No. | 20 | 21 |
|---|---|---|
| r   | 525.19       | −24.77       |
| k   | 0.00000      | 0.00000      |
| B4  | −2.69731E−05 | −7.69955E−06 |
| B6  | −2.00729E−08 | −6.36236E−09 |
| B10 | 6.50117E−12  | 3.74813E−12  |

TABLE 3

(NUMERICAL EXAMPLE 3)

|           | Wide-Angle End | Middle | Telephoto End |
|---|---|---|---|
| f          | 10.67 | 16.01 | 21.34 |
| Fno        | 1.97  | 2.48  | 2.83  |
| ω          | 57.1  | 38.5  | 29.0  |
| Zoom Ratio |       | 2.00  |       |

| Surface No. | Paraxial Radius of Curvature r[mm] | Surface Distance d[mm] | Refractive Index n | Abbe No. ν |
|---|---|---|---|---|
| 1 | 40.67    | 1.50 | 1.850 | 32.27 |
| 2 | 18.88    | 9.83 | —     | —     |
| 3 | −2594.09 | 1.00 | 1.595 | 67.74 |

TABLE 3-continued (NUMERICAL EXAMPLE 3)

|    | Surface | r | d | n | ν |
|---|---|---|---|---|---|
|    | 4  | 26.41   | 6.65     | —     | —     |
|    | 5  | −45.06  | 1.00     | 1.439 | 94.66 |
|    | 6  | 35.86   | 9.50     | 1.892 | 37.13 |
|    | 7  | −45.70  | 0.65     | —     | —     |
|    | 8  | −36.97  | 2.00     | 1.439 | 94.66 |
|    | 9  | 50.99   | Variable | —     | —     |
|    | 10 | 27.21   | 2.85     | 1.916 | 31.60 |
|    | 11 | −217.22 | 0.20     | —     | —     |
|    | 12 | 16.90   | 2.12     | 1.702 | 41.24 |
|    | 13 | 29.51   | 0.53     | —     | —     |
|    | 14 | 56.47   | 0.50     | 1.738 | 32.33 |
|    | 15 | 14.07   | 3.38     | —     | —     |
|    | 16 | −30.64  | 2.00     | 1.806 | 40.93 |
|    | 17 | −39.71  | 1.51     | —     | —     |
| AP | 18 | ∞       | 1.17     | —     | —     |
|    | 19 | 66.62   | 4.13     | 1.595 | 67.74 |
|    | 20 | −15.82  | 0.50     | 1.916 | 31.60 |
|    | 21 | −75.00  | 2.77     | —     | —     |
|    | 22 | 794.12  | 2.22     | 1.595 | 67.74 |
|    | 23 | −26.33  | Variable | —     | —     |
|    | 24 | −27.26  | 0.50     | 1.916 | 31.60 |
|    | 25 | 29.22   | 3.91     | 1.497 | 81.55 |
|    | 26 | −31.16  | 0.57     | —     | —     |
|    | 27 | 119.03  | 3.00     | 2.0010| 29.13 |
|    | 28 | −86.23  | 0.20     | —     | —     |
|    | 29 | 62.34   | 4.63     | 1.439 | 94.66 |
|    | 30 | −25.51  | Variable | —     | —     |
|    | 31 | −36.17  | 1.00     | 1.834 | 37.16 |
|    | 32 | 871.10  | Variable | —     | —     |
|    | 33 | 47.80   | 4.97     | 1.923 | 20.88 |
|    | 34 | −319.43 | 0.20     | —     | —     |
|    | 35 | 23.38   | 3.57     | 1.986 | 16.48 |
|    | 36 | 20.00   | 11.03    | —     | —     |
|    | 37 | ∞       | 1.00     | 1.516 | 64.14 |
|    | 38 | ∞       | 0.50     | —     | —     |

Variable Surface Distance d[mm]

| Surface No. | Wide-Angle End | Middle | Telephoto End |
|---|---|---|---|
| 9  | 26.51 | 13.49 | 3.65  |
| 23 | 1.00  | 6.98  | 11.81 |
| 30 | 2.00  | 1.06  | 3.69  |
| 32 | 7.42  | 15.40 | 17.78 |

TABLE 4

(NUMERICAL EXAMPLE 4)

|           | Wide-Angle End | Middle | Telephoto End |
|---|---|---|---|
| f          | 11.37 | 17.04 | 22.72 |
| Fno        | 2.05  | 2.70  | 3.18  |
| ω          | 54.6  | 36.4  | 27.4  |
| Zoom Ratio |       | 2.00  |       |

| Surface No. | Paraxial Radius of Curvature r[mm] | Surface Distance d[mm] | Refractive Index n | Abbe No. ν |
|---|---|---|---|---|
| 1  | 46.75   | 1.50     | 1.788 | 47.37 |
| 2  | 20.61   | 7.57     | —     | —     |
| 3  | 116.52  | 1.00     | 1.713 | 53.87 |
| 4  | 22.95   | 8.53     | —     | —     |
| 5  | −41.15  | 2.01     | 1.620 | 60.29 |
| 6  | 39.22   | 9.48     | 1.916 | 31.60 |
| 7  | −39.60  | 1.28     | —     | —     |
| 8  | −32.76  | 1.83     | 1.497 | 81.55 |
| 9  | ∞       | Variable | —     | —     |
| 10 | 28.67   | 3.42     | 2.0010| 29.14 |
| 11 | −462.84 | 0.20     | —     | —     |
| 12 | 18.45   | 2.58     | 1.804 | 46.53 |
| 13 | 31.79   | 0.81     | —     | —     |

TABLE 4-continued (NUMERICAL EXAMPLE 4)

|    | Surface No. | r | d | n | ν |
|----|----|--------|----------|-------|-------|
|    | 14 | 55.34 | 0.65 | 1.738 | 32.33 |
|    | 15 | 13.74 | 2.31 | — | — |
|    | 16 | 29.46 | 3.80 | 1.497 | 81.55 |
|    | 17 | −18.43 | 0.65 | 1.916 | 31.60 |
|    | 18 | 30.27 | 1.00 | — | — |
|    | 19 | 29.46 | 5.84 | 1.623 | 57.05 |
|    | 20 | −23.83 | 0.20 | — | — |
| AP | 21 | ∞ | Variable | — | — |
|    | 22 | −26.10 | 2.00 | 1.916 | 31.60 |
|    | 23 | 26.90 | 3.84 | 1.497 | 81.55 |
|    | 24 | −33.87 | 0.20 | — | — |
|    | 25 | 104.77 | 1.98 | 1.835 | 42.74 |
|    | 26 | −77.30 | 1.14 | — | — |
|    | 27 | 44.97 | 6.91 | 1.439 | 94.66 |
|    | 28 | −29.91 | Variable | — | — |
|    | 29 | −44.81 | 1.00 | 1.497 | 81.55 |
|    | 30 | −6682.98 | Variable | — | — |
|    | 31 | 34.48 | 5.68 | 1.959 | 17.47 |
|    | 32 | −73.98 | 3.00 | 1.738 | 32.33 |
|    | 33 | 37.33 | 7.77 | — | — |
|    | 34 | ∞ | 1.00 | 1.516 | 64.14 |
|    | 35 | ∞ | 0.50 | — | — |

Variable Surface Distance d(mm)

| Surface No. | Wide-Angle End | Middle | Telephoto End |
|---|---|---|---|
| 9 | 25.15 | 12.26 | 1.74 |
| 21 | 2.61 | 7.49 | 11.55 |
| 28 | 6.79 | 2.07 | 7.60 |
| 30 | 2.78 | 15.50 | 16.53 |

TABLE 5

(NUMERICAL EXAMPLE 5)

|  | Wide-Angle End | Middle | Telephoto End |
|---|---|---|---|
| f | 10.72 | 19.29 | 27.86 |
| Fno | 2.00 | 2.74 | 3.17 |
| ω | 59.1 | 32.3 | 22.4 |
| Zoom Ratio | | 2.60 | |

|   | Surface No. | Paraxial Radius of Curvature r[mm] | Surface Distance d[mm] | Refractive Index n | Abbe No. ν |
|---|----|---------|---------|-------|-------|
|   | 1  | 53.36  | 1.50 | 1.883 | 40.77 |
|   | 2  | 18.94  | 9.11 | — | — |
|   | 3  | −188.90 | 1.00 | 1.595 | 67.74 |
|   | 4  | 47.61  | 5.72 | — | — |
|   | 5  | −33.49 | 1.00 | 1.439 | 94.66 |
|   | 6  | 297.41 | 6.06 | 1.916 | 31.60 |
|   | 7  | −33.32 | 0.55 | — | — |
|   | 8  | −29.75 | 1.00 | 1.439 | 94.66 |
|   | 9  | 272.32 | Variable | — | — |
|   | 10 | 26.81  | 2.81 | 2.0010 | 29.13 |
|   | 11 | −267.56 | 0.20 | — | — |
|   | 12 | 17.90  | 2.48 | 1.772 | 49.60 |
|   | 13 | 45.12  | 0.37 | — | — |
|   | 14 | 85.81  | 0.50 | 1.916 | 31.60 |
|   | 15 | 15.25  | 3.04 | — | — |
| AP | 16 | ∞     | 1.87 | — | — |
|   | 17 | −32.19 | 3.00 | 1.595 | 67.74 |
|   | 18 | −14.42 | 1.49 | 1.916 | 31.60 |
|   | 19 | −25.16 | 0.20 | — | — |
|   | 20 | 39.06  | 2.26 | 1.497 | 81.55 |
|   | 21 | −88.39 | Variable | — | — |
| * | 22 | −32.51 | 1.40 | 1.854 | 40.38 |
| * | 23 | −23.43 | Variable | — | — |
|   | 24 | −29.09 | 0.50 | 1.916 | 31.60 |
|   | 25 | 24.40  | 3.55 | 1.497 | 81.55 |
|   | 26 | −43.46 | 4.25 | — | — |

TABLE 5-continued (NUMERICAL EXAMPLE 5)

| Surface No. | r | d | n | ν |
|----|---------|---------|-------|-------|
| 27 | 159.12 | 1.36 | 1.852 | 40.78 |
| 28 | −1383.30 | 0.20 | — | — |
| 29 | 84.83 | 5.04 | 1.439 | 94.66 |
| 30 | −21.78 | Variable | — | — |
| 31 | −30.50 | 1.00 | 1.855 | 24.80 |
| 32 | −64.69 | Variable | — | — |
| 33 | 22.74 | 5.00 | 2.0010 | 29.13 |
| 34 | 20.20 | 2.74 | — | — |
| 35 | 28.03 | 5.00 | 1.986 | 16.48 |
| 36 | 70.70 | 10.13 | — | — |
| 37 | ∞ | 1.00 | 1.516 | 64.14 |
| 38 | ∞ | 0.50 | — | — |

Variable Surface Distance d[mm]

| Surface No. | Wide-Angle End | Middle | Telephoto End |
|---|---|---|---|
| 9  | 33.34 | 13.50 | 1.01 |
| 21 | 1.54  | 3.00  | 2.43 |
| 23 | 1.00  | 4.28  | 6.43 |
| 30 | 3.73  | 1.09  | 11.77 |
| 32 | 2.58  | 20.31 | 20.55 |

Aspherical Coefficient

| | Surface No. | |
|---|---|---|
| | 22 | 23 |
| r | −32.51 | −23.43 |
| k | 0.00000 | 0.00000 |
| B4 | −1.37245E−05 | −5.10700E−06 |
| B6 | 2.53112E−08 | 3.37660E−08 |
| B8 | −2.15563E−10 | −1.66097E−10 |
| B10 | 9.28299E−13 | 7.09075E−13 |

TABLE 6

(NUMERICAL EXAMPLE 6)

|  | Wide-Angle End | Middle | Telephoto End |
|---|---|---|---|
| f | 11.03 | 16.55 | 22.06 |
| Fno | 2.07 | 2.46 | 2.83 |
| ω | 57.4 | 37.6 | 28.1 |
| Zoom Ratio | | 2.00 | |

|   | Surface No. | Paraxial Radius of Curvature r[mm] | Surface Distance d[mm] | Refractive Index n | Abbe No. ν |
|---|----|---------|---------|-------|-------|
|   | 1  | 81.40  | 1.50 | 1.892 | 37.13 |
|   | 2  | 19.59  | 8.51 | — | — |
|   | 3  | −337.83 | 1.00 | 1.595 | 67.74 |
|   | 4  | 39.46  | 5.08 | — | — |
|   | 5  | −55.55 | 1.00 | 1.497 | 81.55 |
|   | 6  | 35.21  | 7.77 | 1.916 | 31.60 |
|   | 7  | −48.88 | 0.66 | — | — |
|   | 8  | −38.05 | 1.00 | 1.439 | 94.66 |
|   | 9  | 60.11  | Variable | — | — |
|   | 10 | 32.58  | 4.50 | 2.0010 | 29.13 |
|   | 11 | −121.28 | 0.36 | — | — |
|   | 12 | 20.04  | 2.81 | 1.804 | 46.53 |
|   | 13 | 45.58  | 0.60 | — | — |
|   | 14 | 265.47 | 0.60 | 1.916 | 31.60 |
|   | 15 | 16.52  | 2.00 | — | — |
|   | 16 | 69.46  | 3.67 | 1.497 | 81.55 |
|   | 17 | −14.77 | 0.55 | 1.916 | 31.60 |
|   | 18 | 196.29 | 3.87 | — | — |
|   | 19 | 323.31 | 3.14 | 1.835 | 42.74 |
|   | 20 | −22.78 | Variable | — | — |
| AP | 21 | ∞    | 1.00 | — | — |
|   | 22 | 81.37  | 2.31 | 1.892 | 37.13 |

TABLE 6-continued (NUMERICAL EXAMPLE 6)

| | | | | |
|---|---|---|---|---|
| 23 | −39.09 | 0.50 | 1.855 | 24.80 |
| 24 | −170.26 | 0.86 | — | — |
| 25 | −34.72 | 0.89 | 1.801 | 34.97 |
| 26 | 24.29 | 5.00 | 1.497 | 81.55 |
| 27 | −47.60 | Variable | — | — |
| 28 | 68.69 | 3.90 | 1.439 | 94.66 |
| 29 | −25.14 | Variable | — | — |
| 30 | −36.35 | 1.00 | 1.916 | 31.60 |
| 31 | −152.11 | Variable | — | — |
| 32 | 56.77 | 3.95 | 1.986 | 16.48 |
| 33 | −215.20 | 14.41 | — | — |
| 34 | ∞ | 1.00 | 1.516 | 64.14 |
| 35 | ∞ | 0.50 | — | — |

| | Variable Surface Distance d[mm] | | |
|---|---|---|---|
| Surface No. | Wide-Angle End | Middle | Telephoto End |
| 9 | 28.99 | 14.69 | 3.53 |
| 20 | 1.00 | 6.25 | 9.75 |
| 27 | 3.28 | 4.65 | 5.28 |
| 29 | 1.50 | 3.06 | 10.68 |
| 31 | 8.12 | 14.24 | 13.66 |

TABLE 7

| | Ex. 1 | Ex. 2 | Ex. 3 | Ex. 4 | Ex. 5 | Ex. 6 |
|---|---|---|---|---|---|---|
| f1 | −18.532 | −22.323 | −29.638 | −22.022 | −21.223 | −19.466 |
| f2 | 29.913 | 29.637 | 29.934 | 30.564 | 29.358 | 33.579 |
| f2p | 24.455 | 25.674 | 21.885 | 22.081 | 26.105 | 24.872 |
| f2n | −15.810 | −22.468 | −21.961 | −12.421 | −20.306 | −14.972 |
| m2 | 23.560 | 33.503 | 22.865 | 23.403 | 32.325 | 25.458 |
| m3 | 15.187 | 27.328 | 12.056 | 14.459 | 31.437 | 16.711 |
| vd1p | 31.604 | 31.604 | 37.134 | 31.604 | 31.604 | 31.604 |
| θ gF1p | 0.591 | 0.591 | 0.578 | 0.591 | 0.591 | 0.591 |
| Inequality (1) 0.65 ≤ f2p/f2 ≤ 2.00 | 0.818 | 0.866 | 0.731 | 0.722 | 0.889 | 0.741 |
| Inequality (2) −0.85 ≤ f2n/f2 < 0 | −0.529 | −0.758 | −0.734 | −0.406 | −0.692 | −0.446 |
| Inequality (3) −2.00 < f2p/f2n < −0.95 | −1.547 | −1.143 | −0.997 | −1.778 | −1.286 | −1.661 |
| Inequality (4) 1.0 < m2/m3 < 2.5 | 1.551 | 1.226 | 1.897 | 1.619 | 1.028 | 1.523 |
| Inequality (5) −0.85 < f1/f2 < −0.55 | −0.620 | −0.753 | −0.689 | −0.721 | −0.723 | −0.580 |
| Inequality (6) vd1p < 40 | 31.604 | 31.604 | 37.134 | 31.604 | 31.604 | 31.604 |
| Inequality (7) θ gF1p + 0.00162 × v1dp − 0.64146 < 0.006 | 0.001 | 0.001 | −0.003 | 0.001 | 0.001 | 0.001 |
| Inequality (9) Ndp > 1.85 | 1.986 | 1.986 | 1.923 | 1.959 | 1.986 | 1.986 |
| Inequality (10) vdp < 25 | 16.484 | 16.484 | 20.880 | 17.471 | 16.484 | 16.484 |

IMAGE PICKUP APPARATUS

Figure 13:
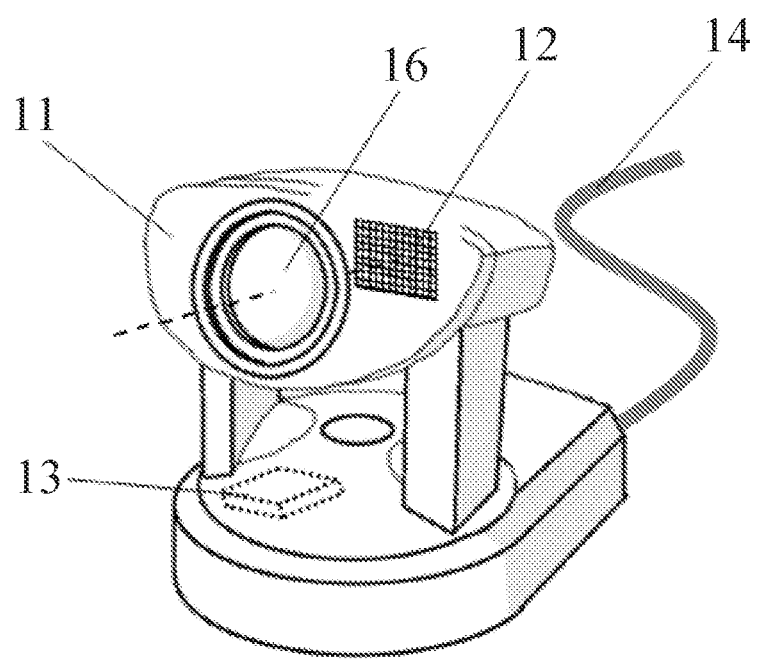
FIG. 13 is a diagram illustrating an image pickup apparatus including a zoom lens according to any one of Examples 1 to 6.

FIG. 13 illustrates an image pickup apparatus (surveillance camera) using the zoom lens according to any one of Examples 1 to 6 as an imaging optical system. In FIG. 13, a reference numeral 16 denotes an imaging optical system including the zoom lens according to any one of Examples 1 to 6. A reference numeral 11 denotes a camera body. A reference numeral 12 denotes an image sensor, such as a CCD sensor and a CMOS sensor, for capturing (photoelectrically converting) an object image formed by the imaging optical system 16. A reference numeral 13 denotes a recording medium that records image information generated from a signal output from the image sensor 12. A reference numeral 14 denotes a cable as a transferring unit for transferring the image information to an external device.

By applying the zoom lens according to any one of Examples 1 to 6 to an image pickup apparatus such as a surveillance camera, it is possible to realize a small and wide-angle image pickup apparatus having good optical performance capable of supporting a high resolution.

The image pickup apparatus using the zoom lens according to any one of Examples 1 to 6 is not limited to a surveillance camera, and the zoom lens according to any one of Examples 1 to 6 can also be used in another image pickup apparatus such as a video camera and a digital still camera. In addition to the zoom lens, the image pickup apparatus may further include an image processing circuit that electrically corrects aberration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-023804, filed on Feb. 18, 2022, which is hereby incorporated by reference herein in its entirety.

What is claimed is:

1. A zoom lens comprising, in order from an object side to an image side:
   a first lens unit having a negative refractive power;
   a second lens unit having a positive refractive power;
   a middle group including two or more lens units; and
   a rear group including one or more lens units and having a positive refractive power,
   wherein the first lens unit does not move for zooming,
   wherein during zooming, the second lens unit moves and a distance between each adjacent lens units changes,
   wherein in all lens units of the zoom lens, during zooming the second lens unit moves by a largest moving amount and has a largest zooming ratio between a wide-angle end and a telephoto end, and wherein the following inequalities are satisfied:

$$0.65 \leq f2p/f2 \leq 2.00$$

$$-0.85 \leq f2n/f2 < 0$$

where f2p represents a shortest focal length in a focal length of at least one positive lens in the second lens unit, f2n represents a shortest focal length in a focal length of at least one negative lens in the second lens unit, and f2 represents a focal length of the second lens unit.

2. The zoom lens according to claim 1, wherein the following inequality is satisfied:

$$-2.00 \leq f2p/f2n \leq -0.95.$$

3. The zoom lens according to claim 1, wherein the middle group includes a third lens unit adjacent to the second lens unit, and
wherein the following inequality is satisfied:

$$1.0 < m2/m3 \leq 2.5$$

where m2 represents a moving amount of the second lens unit between the wide-angle end and the telephoto end, and m3 represents a moving amount of the third lens unit between the wide-angle end and the telephoto end.

4. The zoom lens according to claim 3, wherein the second lens unit or the third lens unit includes an aperture diaphragm.

5. The zoom lens according to claim 1, wherein the following inequality is satisfied:

$$-0.85 \leq f1/f2 \leq -0.55$$

where f1 represents a focal length of the first lens unit.

6. The zoom lens according to claim 1, wherein the first lens unit includes a positive lens that satisfies the following inequalities:

$$vd1p \leq 40$$

$$\theta gF1p + 0.00162 \times vd1p - 0.64146 \leq 0.006$$

where vd1p represents an Abbe number with respect to a d-line of the positive lens, and $\theta gF1p$ represents a partial dispersion ratio with respect to a g-line and an F-line of the positive lens.

7. The zoom lens according to claim 6, wherein the positive lens included in the first lens unit is cemented to a negative lens.

8. The zoom lens according to claim 1, wherein the following inequality is satisfied:

$$1.85 \leq Ndp$$

where Ndp represents a refractive index with respect to a d-line of a positive lens having a largest refractive index with respect to the d-line in at least one positive lens in the rear group.

9. The zoom lens according to claim 8, wherein the following inequality is satisfied:

$$vdp \leq 25$$

where vdp represents an Abbe number with respect to the d-line of the positive lens having the largest refractive index included in the rear group.

10. The zoom lens according to claim 1, wherein the middle group includes at least one lens unit having a negative refractive power.

11. The zoom lens according to claim 10, wherein the middle group includes a lens unit that moves for focusing and has a negative refractive power.

12. The zoom lens according to claim 1, wherein the middle group includes, in order from the object side to the image side, a third lens unit having a positive refractive power and a fourth lens unit having a negative refractive power, and
wherein the rear group includes a fifth lens unit having a positive refractive power.

13. The zoom lens according to claim 1, wherein the middle group includes, in order from the object side to the image side, a third lens unit having a positive refractive power, a fourth lens unit having a positive refractive power, and a fifth lens unit having a negative refractive power, and
wherein the rear group includes a sixth lens unit having a positive refractive power.

14. An image pickup apparatus comprising:
a zoom lens; and
an image sensor configured to capture an image formed by the zoom lens,
wherein the zoom lens includes, in order from an object side to an image side:
a first lens unit having a negative refractive power;
a second lens unit having a positive refractive power;
a middle group including two or more lens units; and
a rear group including one or more lens units and having a positive refractive power,
wherein the first lens unit does not move for zooming,
wherein during zooming, the second lens unit moves, and each distance between adjacent lens units changes,
wherein in all lens units of the zoom lens, the second lens unit moves by a largest moving amount and has a largest zooming ratio between a wide-angle end and a telephoto end, and
wherein the following inequalities are satisfied:

$$0.65 \leq f2p/f2 \leq 2.00$$

$$-0.85 \leq f2n/f2 < 0$$

where f2p represents a shortest focal length in a focal length of at least one positive lens in the second lens unit, f2n represents a shortest focal length in a focal length of at least one negative lens in the second lens unit, and f2 represents a focal length of the second lens unit.

\* \* \* \* \*